United States Patent [19]
Doak

[11] Patent Number: 6,089,722
[45] Date of Patent: Jul. 18, 2000

[54] KALEIDOSCOPE FOR VIEWING MULTIPLE REFLECTIONS HAVING A SPECIFIC GEOMETRIC SHAPE

[76] Inventor: Donald A. Doak, 5901 Trout Ave., Gladwin, Mich. 48624

[21] Appl. No.: 08/904,038

[22] Filed: Jul. 31, 1997

[51] Int. Cl.[7] .................................................. G02B 27/08
[52] U.S. Cl. .......................................................... 359/616
[58] Field of Search ..................................... 359/616, 617

[56] References Cited

U.S. PATENT DOCUMENTS

| | | | |
|---|---|---|---|
| 1,518,204 | 9/1924 | Husted | 359/616 |
| 2,430,318 | 11/1947 | Zimmerman | 88/15 |
| 3,131,593 | 5/1964 | Grow | 88/15 |
| 3,740,112 | 6/1973 | Lundgren | 350/965 |
| 3,809,879 | 5/1974 | Gonzalez | 240/13.1 |
| 3,860,324 | 1/1975 | Gonzalez | 350/2 |
| 4,061,414 | 12/1977 | Price | 350/4 |
| 4,172,629 | 10/1979 | Allen | 350/4.1 |
| 4,232,932 | 11/1980 | Atwater et al. | 350/4.1 |
| 4,241,550 | 12/1980 | Sumner | 52/81 |
| 4,475,126 | 10/1984 | Akins | 358/250 |
| 4,612,583 | 9/1986 | Ayervais | 358/250 |
| 4,793,671 | 12/1988 | Palochak et al. | 350/4.1 |
| 4,799,764 | 1/1989 | Crowell | 350/18 |
| 4,820,004 | 4/1989 | Briskin | 350/4.1 |
| 4,838,541 | 6/1989 | Stone | 272/27 |
| 5,020,870 | 6/1991 | Gray | 350/4.1 |
| 5,023,725 | 6/1991 | McCutchen | 358/231 |
| 5,054,865 | 10/1991 | Huang | 359/617 |
| 5,220,457 | 6/1993 | Mouner | 359/616 |
| 5,241,418 | 8/1993 | Doak | 359/616 |
| 5,288,260 | 2/1994 | Chen et al. | 446/243 |
| 5,475,532 | 12/1995 | Sandoval et al. | 359/616 |
| 5,524,396 | 6/1996 | Lalvani | 52/81.1 |
| 5,651,679 | 7/1997 | Altman | 434/21 |
| 5,757,548 | 5/1998 | Shimomukai | 359/616 |

OTHER PUBLICATIONS

Coxeter, H.S.M., Regular Complex Polytopes Second Edition, Cambridge University Press, pp. 21–24 (1974).

*Primary Examiner*—Safet Metjahic
*Assistant Examiner*—Christopher E. Mahoney
*Attorney, Agent, or Firm*—Mary M. Moyne; Ian C. McLeod

[57] ABSTRACT

A kaleidoscope (100) for producing images reflecting objects (152, 164), is described. The kaleidoscope preferably has three panels (10, 20 and 30) forming the kaleidoscope with a front viewing opening (104) and a rear object opening (106). The sides (16 and 18) of the first panel preferably converge at a 21.0° angle. The sides (26 and 28) of the second panel preferably converge at a 32.0° angle. The sides of the third panel preferably converge at a 37.75° angle. By varying the orientation of the rear edges (14, 24 and 34) of the panels, the first object image (150) is varied. By varying the orientation of the front edges (12, 22 and 32) of the panels, the secondary image (154) is varied.

42 Claims, 20 Drawing Sheets

KALEIDOSCOPE FOR VIEWING MULTIPLE REFLECTIONS HAVING A SPECIFIC GEOMETRIC SHAPE

BACKGROUND OF THE INVENTION (1) Field of the Invention

The present invention relates to a kaleidoscope for viewing the reflection of an object where the reflection has a specific geometric shape. In particular, the present invention relates to a kaleidoscope for viewing a first object image surrounded by a second object image all encompassed by a secondary image. The orientation, front or rear edges of the panels of the kaleidoscope are varied to change the shape of the images. The invention also relates to a kaleidoscope where the panels used to construct the kaleidoscope have set shapes which allows the overall shape of the image to remain constant regardless of the object.

(2) Description of the Related Art

The related art has shown various types of kaleidoscopes. Illustrative are U.S. Pat. No. 5,475,532 to Sandoval et al; U.S. Pat. No. 5,220,457 to Mouner; U.S. Pat. No. 5,023,725 to McCutchen; U.S. Pat. No. 3,740,112 to Lundgren; and U.S. Pat. No. 3,131,593 to Grow.

In addition, Sandoval et al describes a kaleidoscope housing in the form of an irregular polyhedron having four of its sides providing irregular polygonal reflective mirrors joined along respective edges of the polyhedron at specified dihedral angles. The remaining sides are triangular viewing windows. The triangular windows produce three dimensional geometric images in the interior space of the housing when viewed through any window. The images have triaxial symmetry and repeat to infinity.

Mouner describes a kaleidoscope which is able to reliably reproduce and record a pattern. The kaleidoscope has two mirrors with the angle between the mirrors being varied to create different images. The patent does not mention using three mirrors or using a specific set of three angles to produce platonic solid images.

Lundgren shows an optical device for creating patterns based on viewing objects. The device has a polygonal transverse cross-section which can include a triangular cross-section. The triangular polygon mentioned in the patent is an equilateral triangle with 60° dihedral angles. The patent provides a series of equations for determining the number of images that will be produced for a given cross-section.

Grow shows a three mirrored kaleidoscope with a unique means for holding the mirrors in position. No indication is given as to the angles of the mirrors or the images produced.

McCutchen describes a dodecahedron photography and projection system.

Also of interest are U.S. Pat. No. 2,430,318 to Zimmerman; U.S. Pat. No. 3,809,879 to Gonzalez; U.S. Pat. No. 3,860,324 to Gonzalez; U.S. Pat. No. 4,061,414 to Price; U.S. Pat. No. 4,172,629 to Allen; U.S. Pat. No. 4,232,932 to Atwater et al; U.S. Pat. No. 4,475,126 to Akins; U.S. Pat. No. 4,612,583 to Ayervais; U.S. Pat. No. 4,793,671 to Palochak et al; U.S. Pat. No. 4,799,764 to Crowell; U.S. Pat. No. 4,820,004 to Briskin; U.S. Pat. No. 4,838,541 to Stone; U.S. Pat. No. 5,020,870 to Gray; U.S. Pat. No. 5,054,865 to Huang and U.S. Pat. No. 5,288,260 to Chen et al.

Only of minimal interest are U.S. Pat. No. 5,524,396 to Lalvani and U.S. Pat. No. 4,241,550 to Sumner which show geometric structures not related to kaleidoscopes.

There remains the need for a kaleidoscope which is able to create images having specific geometric shapes such as mathematically precise sphere, dodecahedron, icosahedron, 12 point star dodecahedron, 20 point star icosahedron, reversed 12 point star and reverse 20 point star icosahedron. There also remains a need for a kaleidoscope which produces a second object image which surrounds the first object image and has a specific geometric shape.

Objects

IT is therefore an object of the present invention to provide a kaleidoscope having three panels where the panels have specific shapes such that the converging angles of the panels are 21.0°, 32.0° and 37.75°. Further, it is an object of the present invention to provide a kaleidoscope where the orientation of the rear edges of the panels of the kaleidoscope are varied to change the shape of a first object image. Still further, it is an object of the present invention to provide a kaleidoscope where the orientation of the front edges of the panels of the kaleidoscope are varied to change the shape of a secondary image. Further still, it is an object of the present invention to provide a kaleidoscope where openings are provided in at least one of the panels of the kaleidoscope to produce a second object image. Further, it is an object of the present invention to provide a kaleidoscope where the first object image is one of an icosahedron, dodecahedron, 20 point star icosahedron of varying degrees, 12 point star dodecahedron of varying degrees or an equally divided sphere. It is further an object of the present invention to provide a kaleidoscope where a second object image appears to surround the first object image. Further, it is an object of the present invention to provide a kaleidoscope having a secondary image which gives the user the illusion of looking inside the illusion of a geodesic dome. Still further, it is an object of the present invention to provide a kaleidoscope having an object at the viewing end, not having an opening at the object end.

These and other objects will become increasingly apparent by reference to the following drawings and the description.

DETAILED DESCRIPTION OF THE PREFERRED EMBODIMENTS

Figure 1:
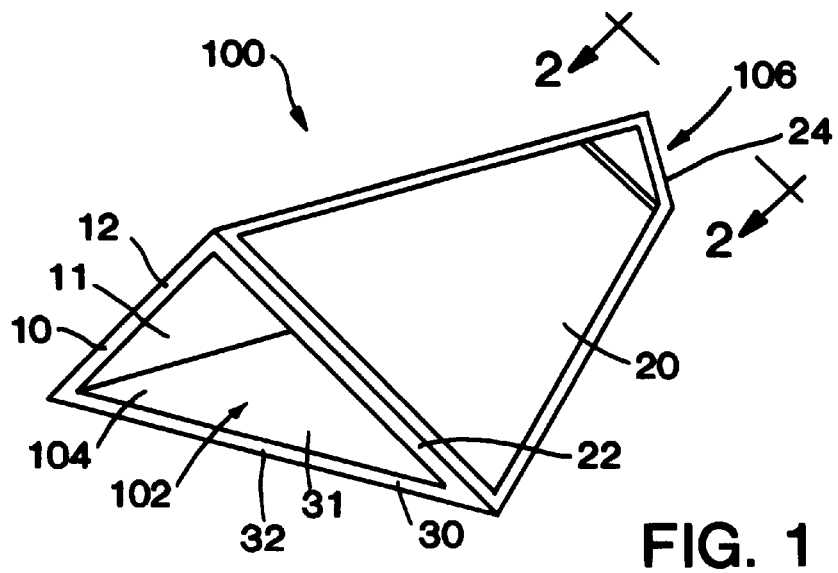
FIG. 1 is a perspective view of the Kaleidoscope 100 showing the front viewing opening 104.

The present invention relates to a kaleidoscope for viewing a first object reflection of a first object, which comprises: at least three panels having front and rear ends with sides and a reflective inner surface therebetween and positioned together such that the reflective inner surfaces of the panels are facing each other such as to form a chamber having a front viewing opening and a rear object opening wherein the rear object opening is positioned adjacent the rear object opening and wherein when the sides of three of the panels are extended such that the sides converge and meet at a point and each of the panels has a triangular shape, angles between the sides of the panels are 21.0°, 32.0° and 37.75°.

Further, the present invention relates to a kaleidoscope for viewing at least a first object reflection of a first object, which comprises: a first panel having a front end and a rear end with first and second sides extending therebetween, the first panel having a reflective inner surface and inside angles between the first and second sides and the rear end; a second panel having a front end and a rear end with first and second sides extending therebetween, the second panel having a reflective inner surface and inside angles between the first and second sides, the second panel being positioned adjacent the first panel such that the first side of the first panel is adjacent the second side of the second panel; and a third panel having a front end and a rear end with first and second sides extending therebetween, the third panel having an inner reflective surface and inside angles between the rear face and the sides wherein the third panel is positioned adjacent the first and second panels such that the first side of the third panel is adjacent the second side of the first panel and the second side of the third panel is adjacent the first side of the second panel, the panels are positioned together such that the inner reflective surfaces of each panel are facing each other and the rear ends of the panels are adjacent each other such that the panels form a chamber having a front viewing end and rear object end and wherein the inside angles of the panels are varied to vary the shape of the first object reflection.

Further still, the present invention relates to a kaleidoscope for viewing a reflection of an object, which comprises: a plurality of panels positioned together to form a chamber having a front viewing opening and a rear object opening, the panels having a front end and a rear end with opposed sides extending therebetween and a reflective inner surface, the panels are positioned together such that one side of one panel is adjacent one side of another panel and another side of one panel is adjacent one side of a different panel, the panels are positioned together such that the reflective surfaces of the panels are facing each other and the rear ends of each panel are adjacent each other and wherein to vary a shape of the reflection, an orientation of the rear end of one panel between the sides of one panel is varied.

Still further, the present invention relates to a kaleidoscope for viewing a first object reflection of a first object, which comprises: at least three panels having front and rear ends with sides extending therebetween and having a reflective inner surface, the panels are positioned together such that the reflective inner surfaces of the panels are facing each other such as to form a chamber having a front viewing opening and a rear object opening wherein the rear object opening is smaller than the front viewing opening, wherein two of the panels are positioned together such that an inner angle between the panels as formed by intersecting planes of the panels is 90° and wherein when the sides of one of the panels are extended beyond the rear end of the panel such that the sides converge and meet at a point, an angle between the sides of the panel is 21.0°.

Further, the present invention relates to a kaleidoscope for viewing a first object reflection of a first object, which comprises: at least three panels having front and rear ends with sides and a reflective inner surface therebetween and positioned together such that the reflective inner surfaces of the panels are facing each other such as to form a chamber having a front viewing opening and wherein the sides of three of the panels meet at a point and each of the panels has a triangular shape and angles between the sides of the panels at the point are 21.0°, 32.0°0 and 37.75° and wherein the first object is positioned adjacent the front viewing opening.

Figure 2:
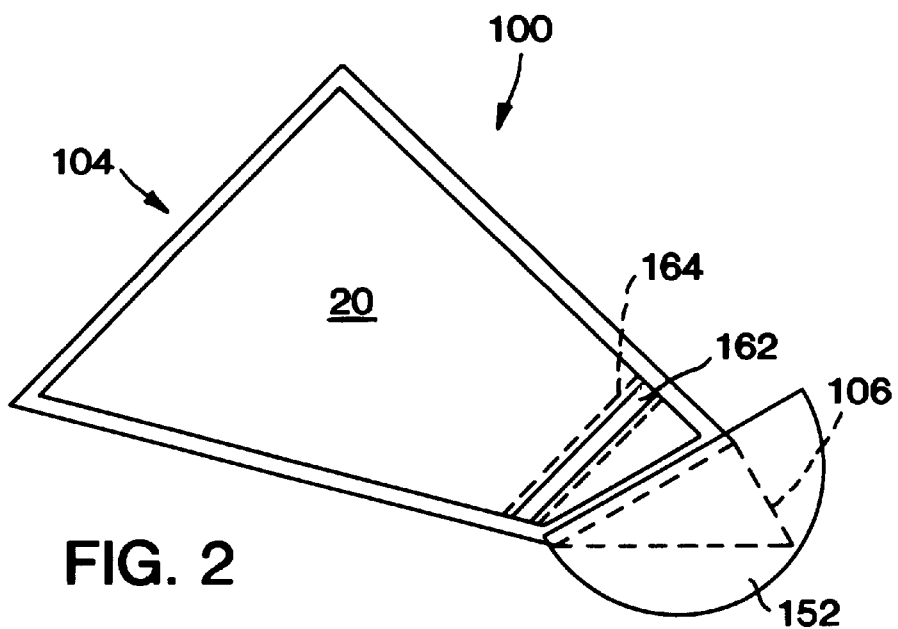
FIG. 2 is a perspective view of the Kaleidoscope 100 showing the rear object opening 106.

FIGS. 1 and 2 show the Kaleidoscope 100 of the preferred embodiment of the present invention. The Kaleidoscope 100 preferably produces a reflection or image or several reflections or images of a single object 152 or multiple objects 152 or 164 where the images have specific geometrical shapes depending upon the shape of the panels 10, 20 or 30 used to construct the Kaleidoscope 100. In the preferred embodiment, the Kaleidoscope 100 is constructed from three panels 10, 20 and 30. The panels 10, 20 and 30 preferably have a quadrilateral shape with a front edge or front end 12, 22 or 32, a rear edge or rear end 14, 24 or 34, a first side 16, 26 or 36 and a second. side 18, 28 or 38, with an inner reflective surface 11, or 31 (two shown) extending therebetween. The panels 10, 20 and 30 are preferably first surface mirrors having a reflective surface on one side. Preferably, the panels 10, 20 and 30 taper from the front edge 12, 22 or 32 to the rear edge 14, 24 or 34 such that the rear edges 14, 24 or 34 of the panels 10, 20 and 30 are shorter than the front edges 12, 22 or 32 of the panels 10, 20 or 30 (FIGS. 1 and 2). The first panel 10 preferably has a shape such that when the sides 16 and 18 are extended such that the sides 16 and 18 converge and intersect at a point, the first converging angle α between the sides 16 and 18 is 21.0° (FIGS. 8 through 12). The second panel 20 preferably has a shape such that when the sides 26 and 28 are extended until the sides 26 and 28 converge and intersect at a point, the second converging angle β between the sides 26 and 28 is 32.0° (FIGS. 8 through 12). In the preferred embodiment, the third panel 30 has a shape such that when the sides 36 and 38 are extended such that the sides 36 and 38 converge and intersect at a point, the third converging angle Δ between the sides 36 and 38 is 37.75° (FIGS. 8 through 12). The panels 10, 20 and 30 can be considered to be formed by the vectors of 21.0°, 32.0° and 37.75° angles respectively. Although the exact angels 21.0°, 32.0° and 37.75° are preferred and present the most mathematically perfect images, the angles α, β and Δ can be varied which would change the shape of the images. Preferably, all the panels 10, 20 and 30 have the same length. However, the exact length of the panels 10, 20 and 30 is determined by the images which are produced and what the user finds aesthetically pleasing. The panels 10, 20 and 30 are preferably mounted together with the rear edges 14, 24 and 34 of the panels 10, 20 and 30 adjacent each other and the front edges 12, 22 and 32 of the panels 10, 20 and 30 adjacent each other such that a chamber 102 having a front viewing opening 104 and a rear object opening 106 is formed (FIGS. 1 and 2). The panels 10, 20 and 30 are mounted together with the inner reflective surfaces 11 and 31 of the panels 10, 20 and 30 facing each other such that the chamber 102 has three reflective walls. In the preferred embodiment, the kaleidoscope 100 tapers from the front viewing opening 104 to the rear object opening 106 such that the rear object opening 106 is smaller than the front viewing opening 104. The chamber 102 preferably has a 90° triangular cross-section. The panels 10, 20 and 30 are preferably mounted together such that the first side 16 of the first panel 10 is adjacent the second side 28 of the second panel 20 and the second side 18 of the first panel 10 is adjacent the first side 36 of the third panel 30. Consequently, the first side 26 of the second panel 20 is adjacent the second side 38 of the third panel 30 to form the three sided triangular Kaleidoscope 100 (FIGS. 1 and 2). The panels 10, 20 and 30 are preferably mounted together such that the sides 16, 18, 26,28, 36 and 38 of the panels 10, 20 and 30 abut each other and are in contact with each other but do not extend beyond each other. The panels 10, 20 and 30 are preferably held together by silicon. However, any other type of fastening means or method may be used. The panels 10, 20 and 30 are preferably securely mounted together such that the panels 10, 20 and 30 do not move apart. Any movement of any of the panels 10, 20 and 30 will effect the shape of the images. In the preferred embodiment, transparent end caps (not shown) are positioned over the front and rear openings 104 and 106 of the Kaleidoscope 100 such as to prevent the mirrors or reflective surfaces 10A, 20A or 30A of the panels 10, 20 and 30 from being damaged.

To form a first object image 150, a first object 152 is positioned adjacent the rear object opening 106 of the Kaleidoscope (FIG. 2). The first object 152 can be any type of object through which light is transmitted or which produces its own light such as for instance a TV screen, high definition TV, laser projection, fiber optic screen, projection, magnifying lens or multifaceted lens. The object 152 can also be a standard rotary kaleidoscope object wheel (not shown) which has smaller objects within which move as the object wheel is rotated. The first object 152 is preferably directly mounted over the rear object opening 106 of the Kaleidoscope 100. Alternately, the first object 152 is spaced slightly apart from the opening 106. In the preferred embodiment, the first object 152 is able to be moved. However, alternately the first object 152 can be stationary.

Figure 19:
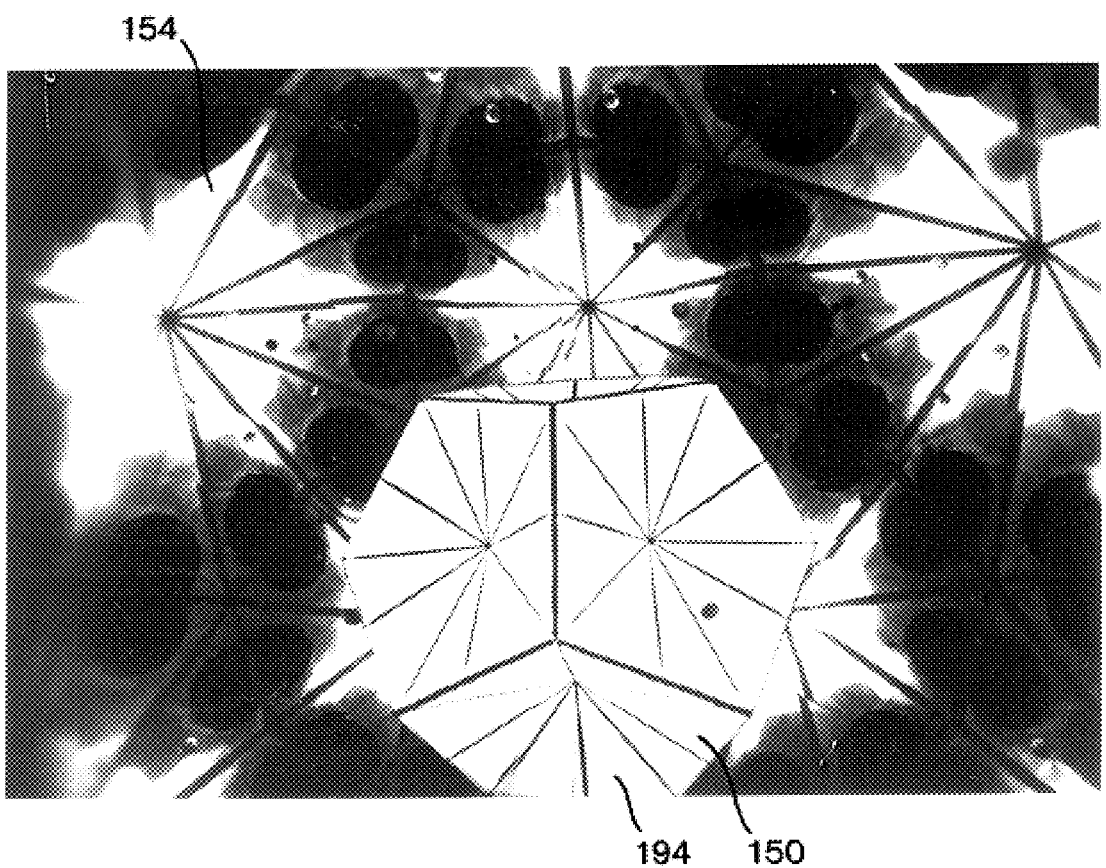
FIG. 19 is a photograph of a reverse 12 point star dodecahedron image 190 produced by the kaleidoscope 100.

The shape of the first object image 150 will depend on the specific orientation of the rear edges 14, 24 and 34 of the panels 10, 20 and 30. The orientation of the rear edges 14, 24 and 34 of the panels 10, 20 and 30 is determined by the first and second inner angles 10A, 10B, 20A, 20B, 30A and 30B respectively of the panels 10, 20 and 30 (FIGS. 8 through 12). The examples (to be described in detail hereinafter) set forth various different combinations of first and second inner angles 10A, 10B, 20A, 20B, 30A and 30B which allow the first object image 150 to be produced having different shapes. Some of the shapes of the first object image 150 produced by the Kaleidoscope 100 are platonic solids such as the dodecahedron (FIG. 3) and the icosahedron (FIG. 4) and also the 20 point icosahedron (FIG. 7), the 12 point dodecahedron (FIGS. 5 and 6), equally divided sphere (FIG. 7), the reverse 12 point icosahedron (FIG. 19) and the reverse 20 point star dodecahedron (not shown). A reverse 12 point star dodecahedron or a reverse 20 point star icosahedron is where the points of the image extend inward toward the center of the image rather than extending outward. The faces of the images seem to be imploding.

Figure 3:
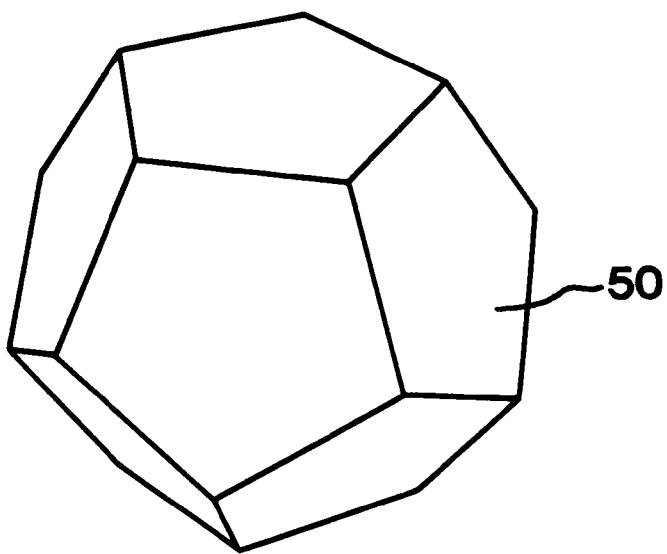
FIG. 3 is a schematic view of a dodecahedron 50.
Figure 16:
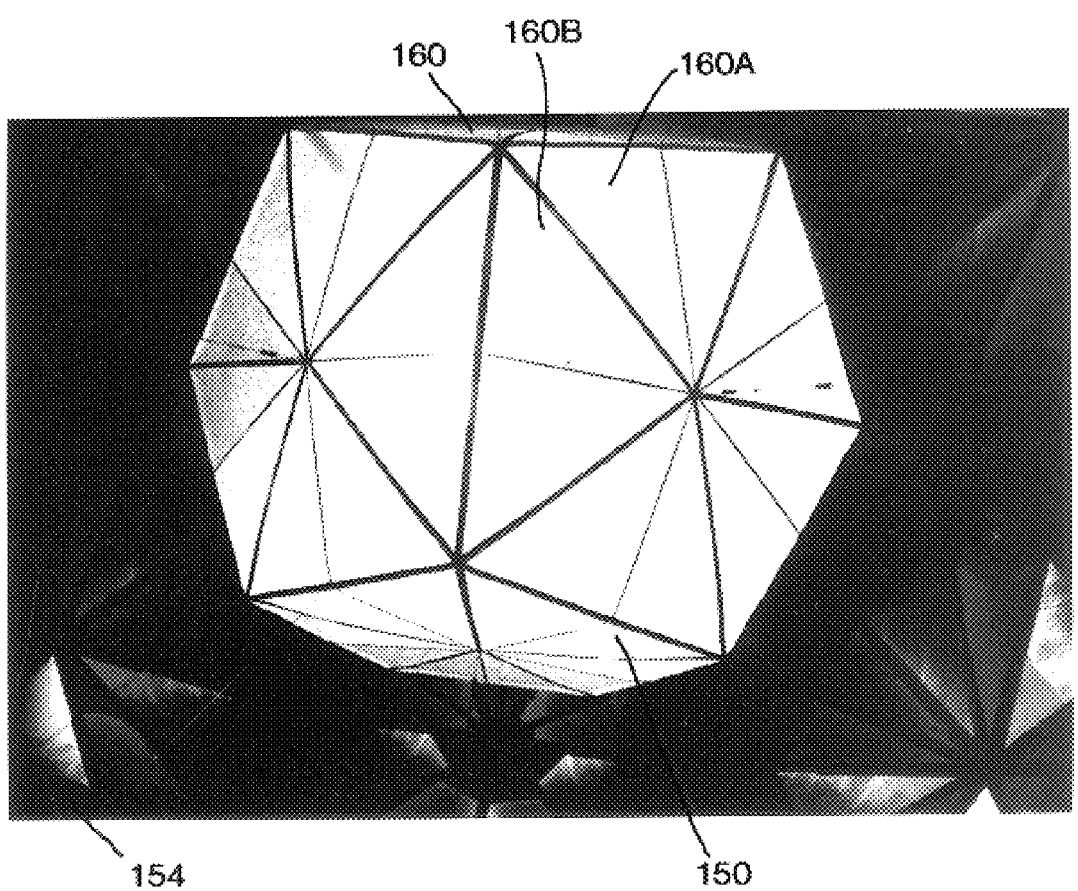
FIG. 16 is a photograph of a dodecahedron image 160 produced by the kaleidoscope 100 showing the triangles 100B.
Figure 17:
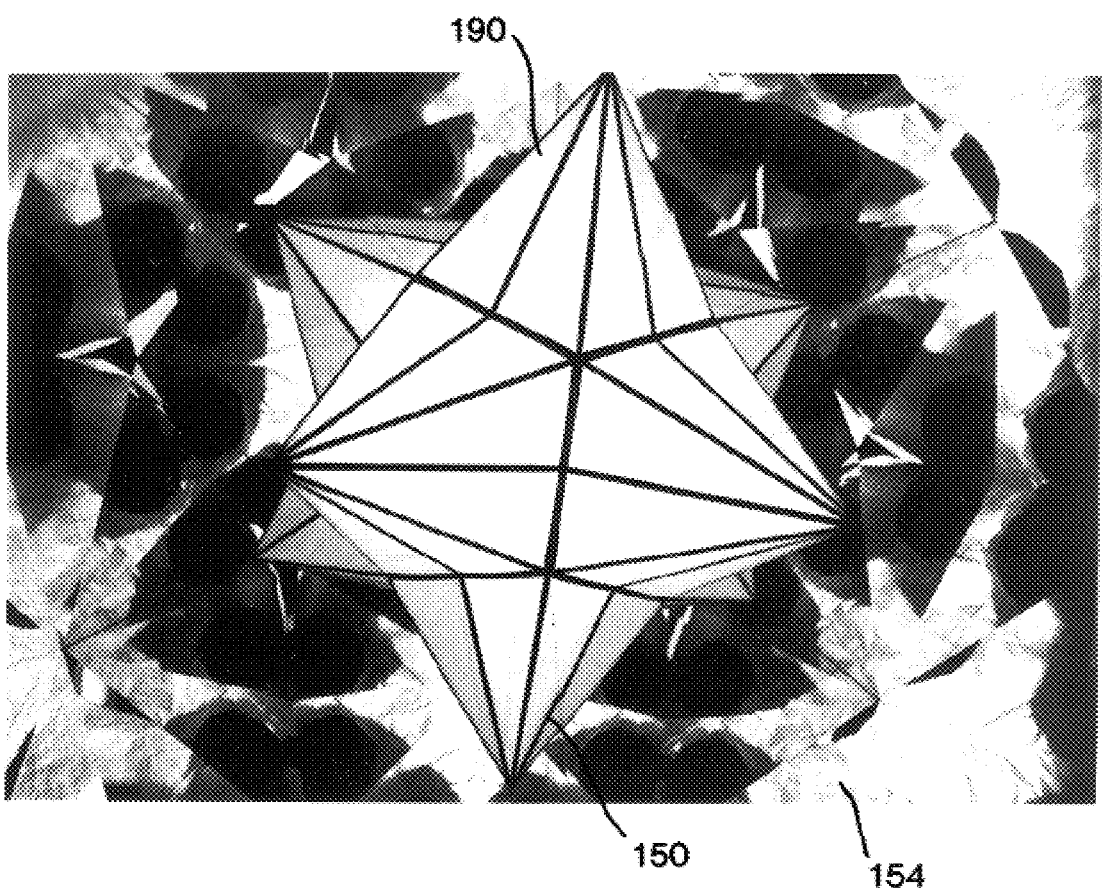
FIG. 17 is a photograph of a 12 point star dodecahedron image 190 produced by the kaleidoscope 100.
Figure 18:
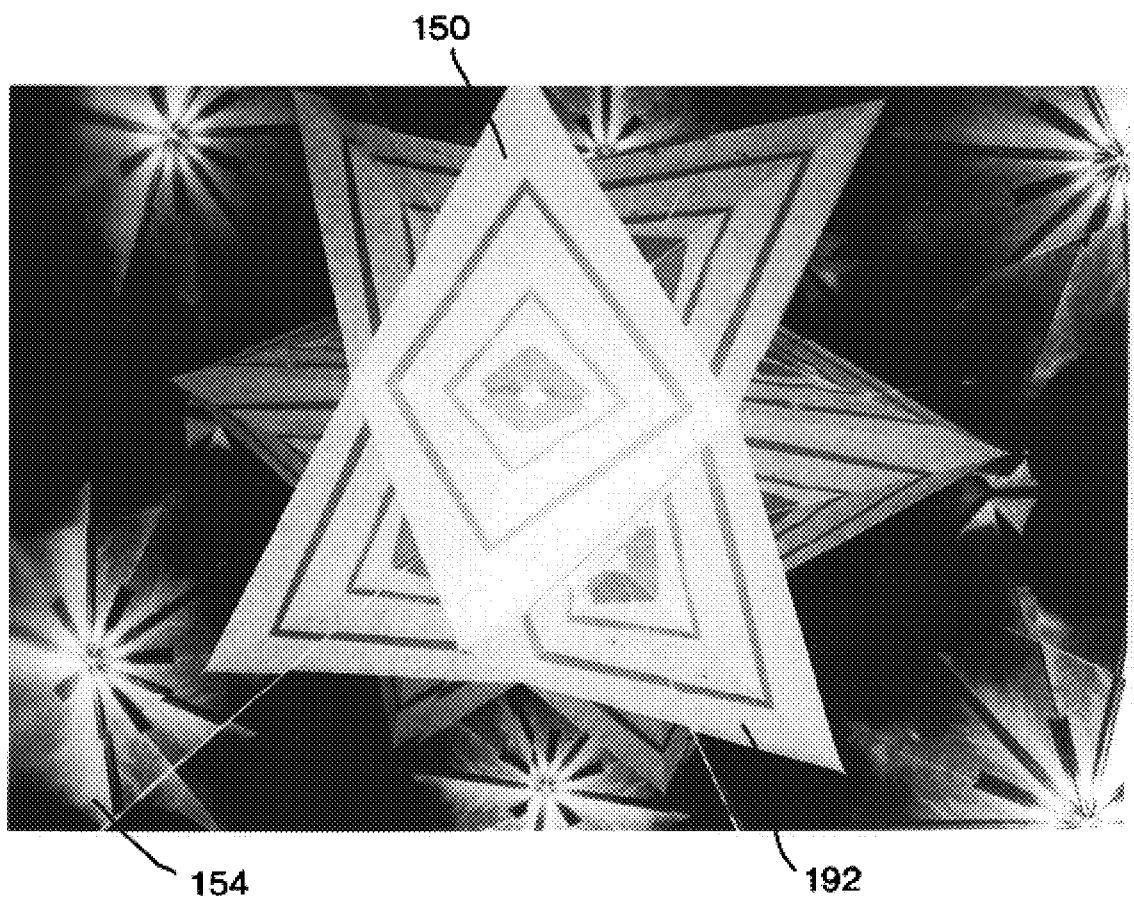
FIG. 18 is a photograph of a 20 point star icosahedron image 192 produced by the kaleidoscope 100.

The dodecahedron image 160 has twelve (12) pentagonal faces 160A, each of the faces 160A has ten (10) triangles 160B (FIGS. 3 and 16). Therefore, each dodecahedron image 160 actually consists of one hundred twenty (120) triangles 160B or partial images. The triangles 160B have angles of 36.0°, 54.0° and 90.0° with the 36.0° angle of the triangles 160B meeting in the center of each of the faces 160A of the dodecahedron image 160. To produce the dodecahedron image 160, the inner reflective surfaces 11, and 31 of the panels 10, 20 and 30 reflect the object one hundred twenty (120) times. Though you can only see approximately half of the triangles at any one time.

Figure 4:
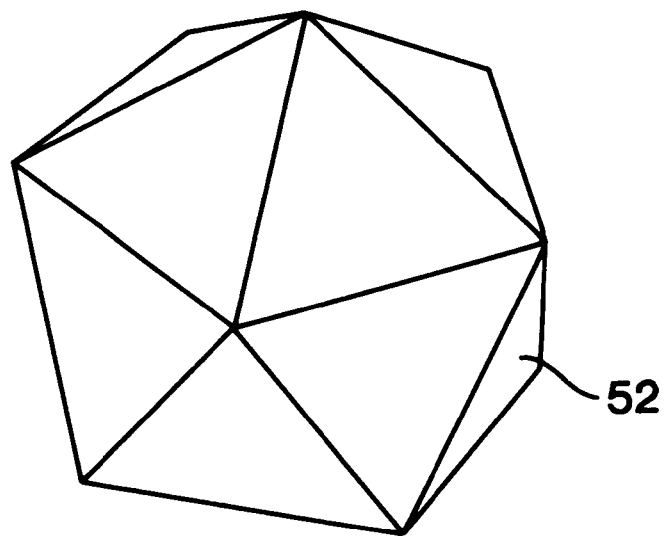
FIG. 4 is a schematic view of an icosahedron 52.
Figure 5:
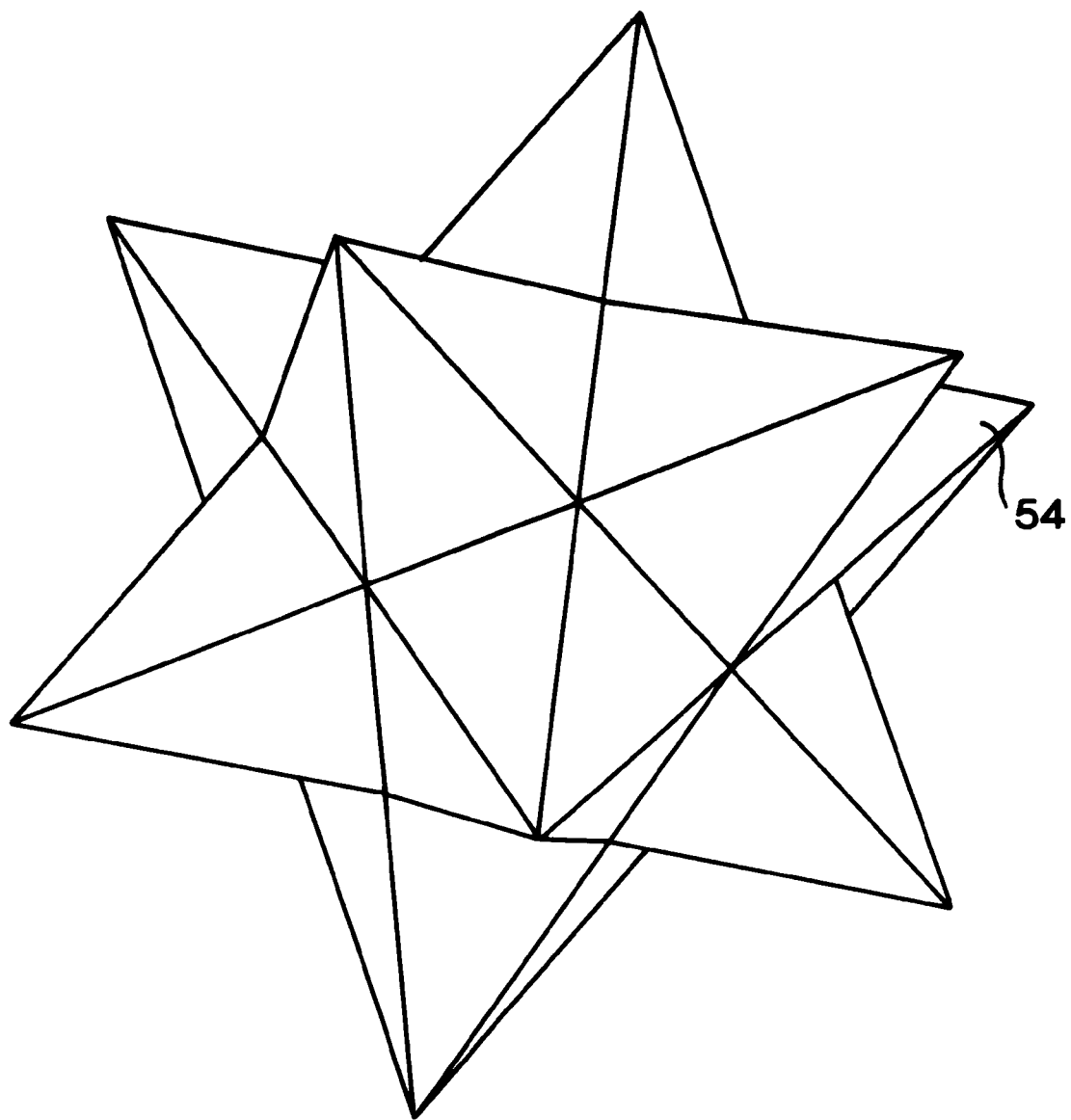
FIG. 5 is a schematic view of a 12 point star dodecahedron 54.
Figure 15:
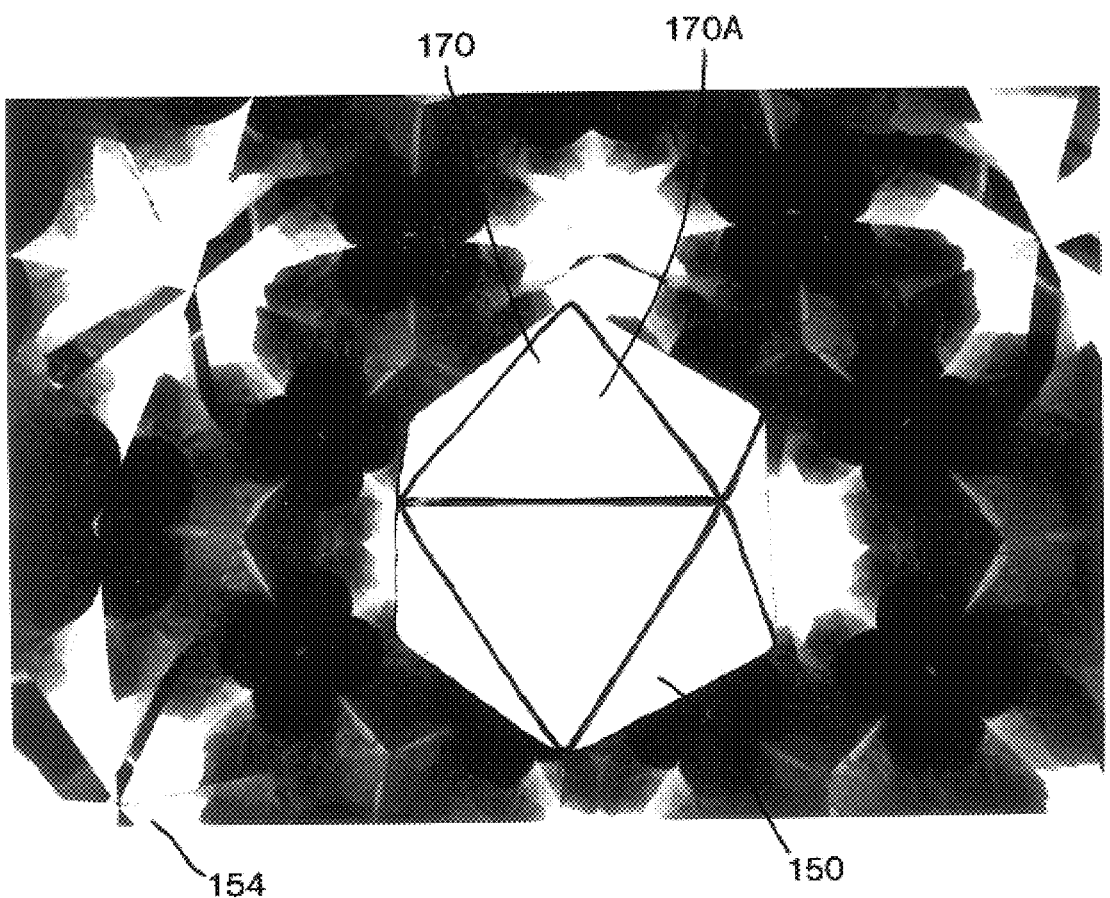
FIG 15 is a photograph of an icosahedron image 170 produced by the kaleidoscope 100.

The icosahedron image 170 has twenty (20) equilateral triangular faces 170A each comprised of six triangles 170B (FIGS. 4 and 15). The triangles have angles of 30.0°, 60.0° and 90.0°. The triangles 170B are positioned with the 60.0° angle of the triangles 170B meeting in the center of each of the faces 170A. Therefore, each icosahedron image 170 actually consists of one hundred twenty (120) triangles 170B or partial images. To produce the icosahedron image 170, the inner reflective surfaces 11, and 31 of the panels 10, 20 and 30 reflect the object one hundred (120) times.

Figure 14:
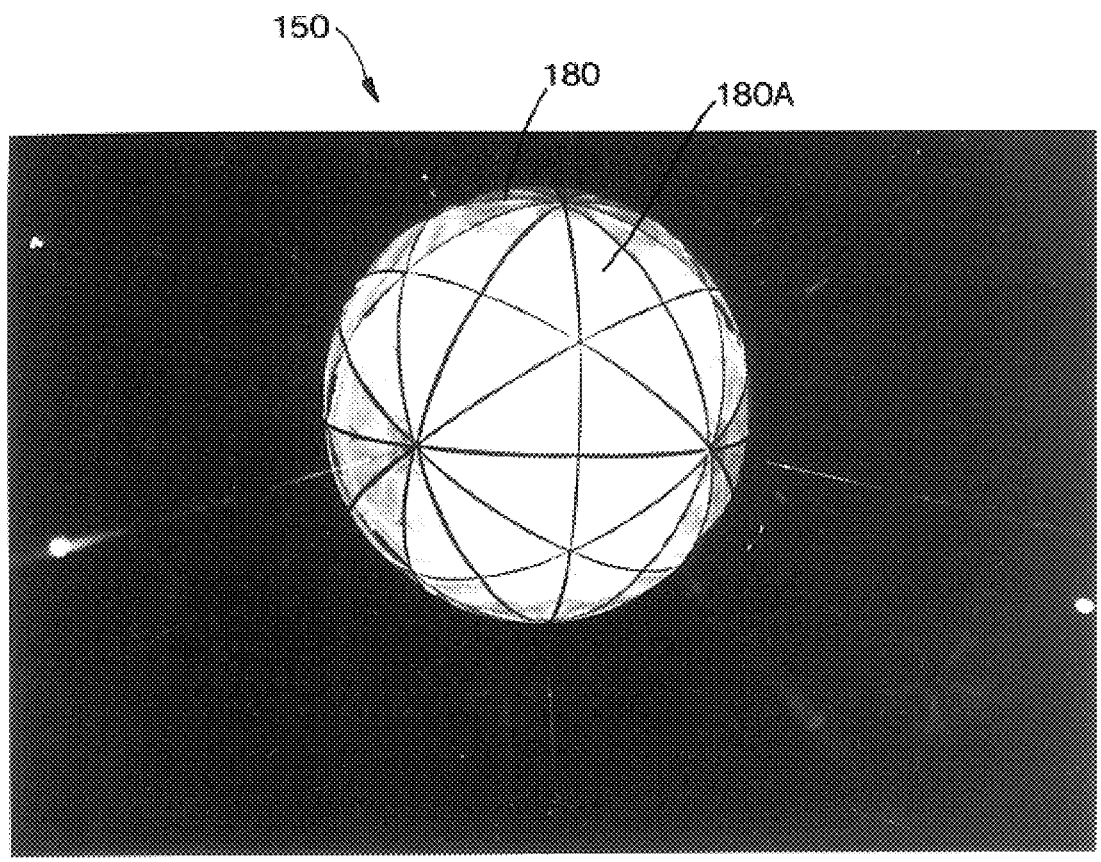
FIG. 14 is a photograph of an equally divided sphere image 180 created by the kaleidoscope 100.

The spherical image 180 is actually made up of small, identical curved triangles 180A. The spherical image 180 is equally divided by the triangles 180A (FIG. 14).

In the preferred embodiment, the Kaleidoscope 100 also has a secondary image 154. The secondary image 154 reflects whatever is located at the front viewing opening 104 of the Kaleidoscope 100. The front viewing opening 104 can also be covered in black and only an opening for the user to view the chamber 102 is allowed. When the front viewing opening 104 is covered in black, no secondary image 154 appears. The shape of the secondary image 154 depends upon the orientation of the front edges 12, 22 and 32 of the panels 10, 20 and 30 as determined by the third and fourth inner angles 10C, 10D, 20C, 20D, 30C and 30D of the panels 10, 20 and 30. In the preferred embodiment, the shape of the secondary image 154 is independent of the first object image 150 or second object image 158. Preferably, the shape of the secondary image 154 can be any of the shapes similar to the first object image 150 such as dodecahedron, icosahedron or sphere, etc. The secondary image 154 preferably gives the user the illusion of actually looking inside a geodesic dome having sides or walls created by the shape of the secondary image 154.

Figure 13:
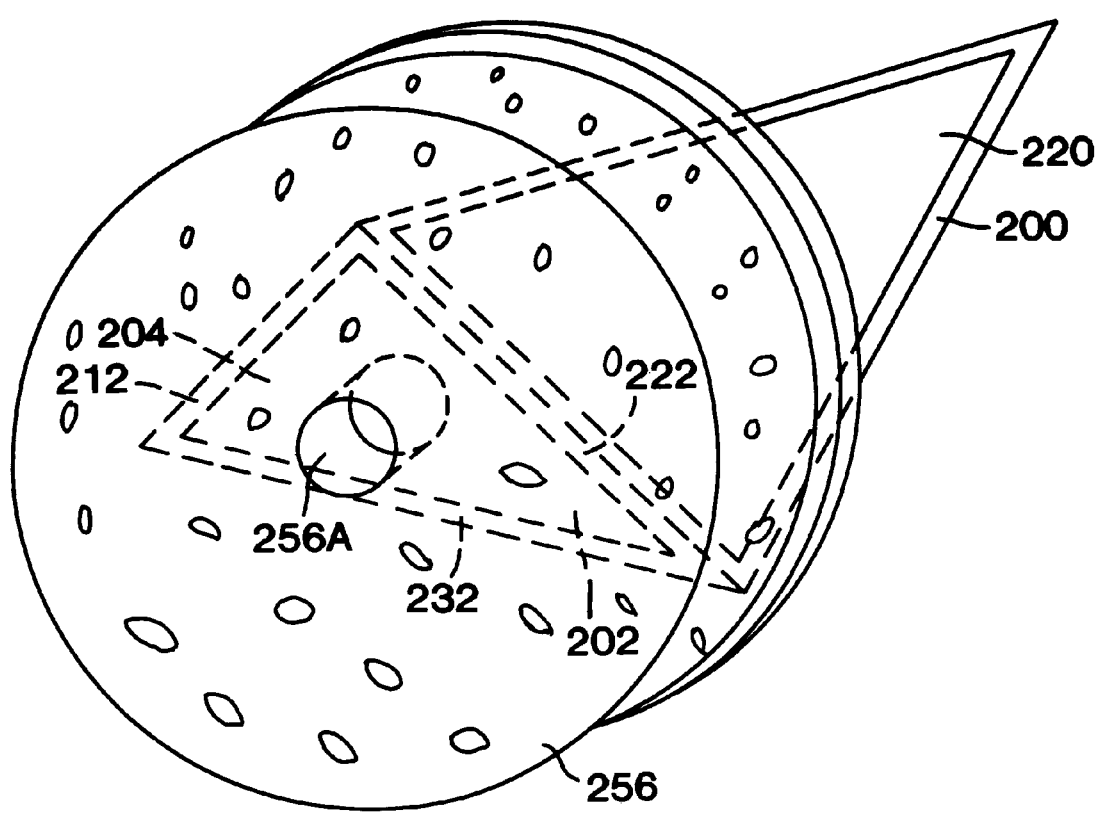
FIG. 13 is a perspective view of the Kaleidoscope 200, an alternate embodiment showing the object wheel 202 adjacent the front viewing opening 204.

In an alternate embodiment, the sides of all three panels 220 (one shown) are extended until the panels 220 intersect or converge at a point (FIG. 13). Consequently, the chamber 202 formed by the three panels 220 has only a front viewing opening 204 (FIG. 13). In this embodiment, a front object 256 is mounted over the front viewing opening 204. The front object 256 has an opening 256A to allow a user to view the inside of the Kaleidoscope 200. The shape of the secondary image (not shown) of this embodiment depends upon the orientation of the front edges 212, 222 and 232 of the panels 220. The exact image or images produced depends upon the type of front object 256 which is used. The front object 256 is preferably a standard object wheel with movable objects inside. The rear edges or the point of the panels 220 or Kaleidoscope 200 will produce a first object image (not shown) of a clear dodecahedron 50 (FIG. 3). Alternately an opening (not shown) could be provided at the rear edges of the panels 220 to provide a first object image. Looking through the opening 256A in the front object 256 will give the user the illusion of looking inside a large geodesic dome made up of pentagons or large empty dodecahedrons with the walls made up of reflected images from the front object 256 or a large dodecahedron with another first object image at the other end.

Figure 12:
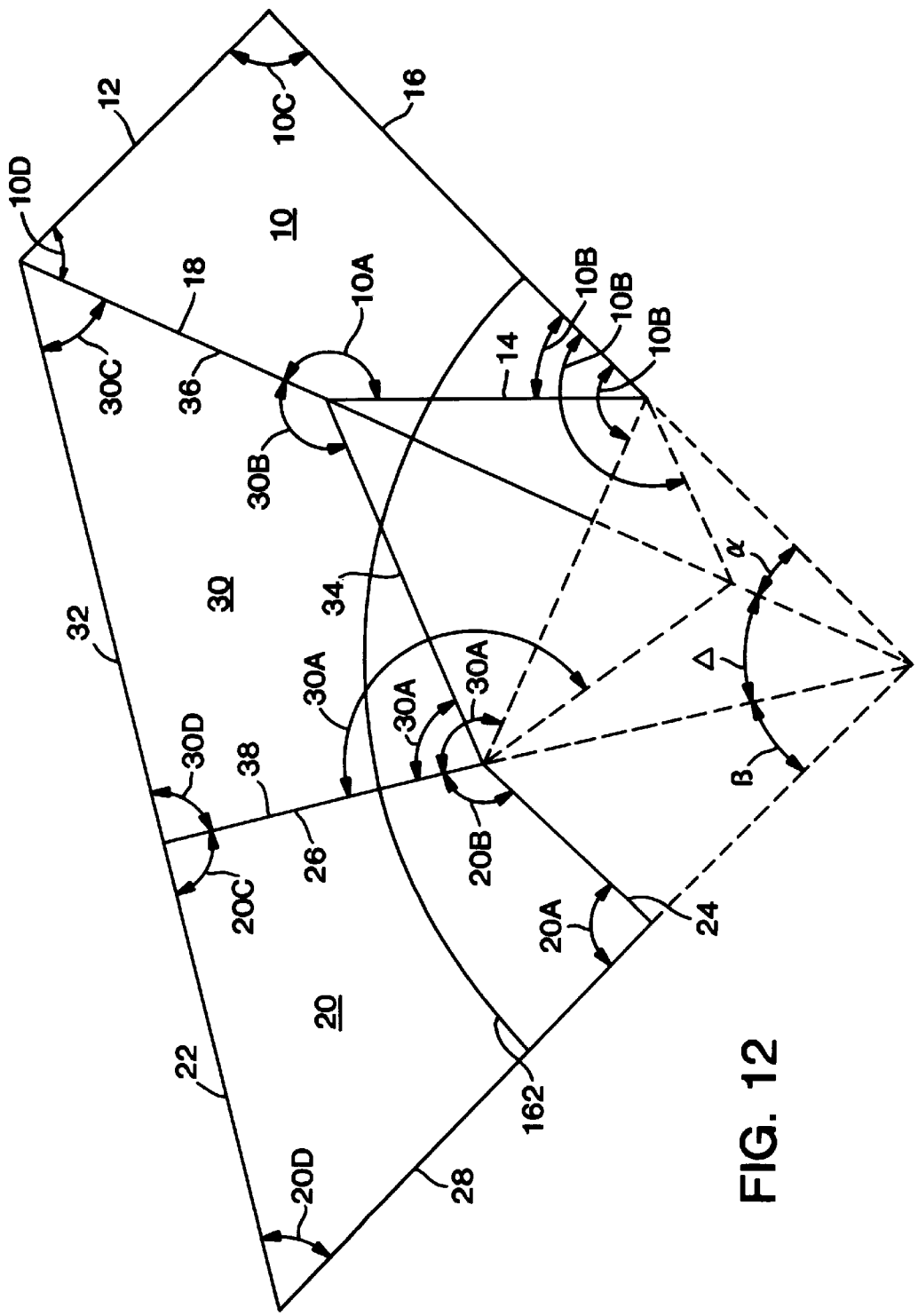
FIG. 12 is a laid open view of the Kaleidoscope 100 of Example 5.

To produce a first object image 150 having the shape of an equally divided sphere (FIG. 14), the rear edges 14, 24 and 34 of the panels 10, 20 and 30 are curved or arcuate. The rear edges 14, 24 and 34 have such a curve that when the Kaleidoscope 100 is disconnected at one intersection and the panels 10, 20 and 30 are laid open, the rear edges 14, 24 and 34 of the panels 10, 20, 30 form a portion of a circle having its center at the point where all the sides 16, 18, 26, 28, 36 and 38 of the panels 10, 20 and 30 converge at a point (FIG. 12).

Figure 6:
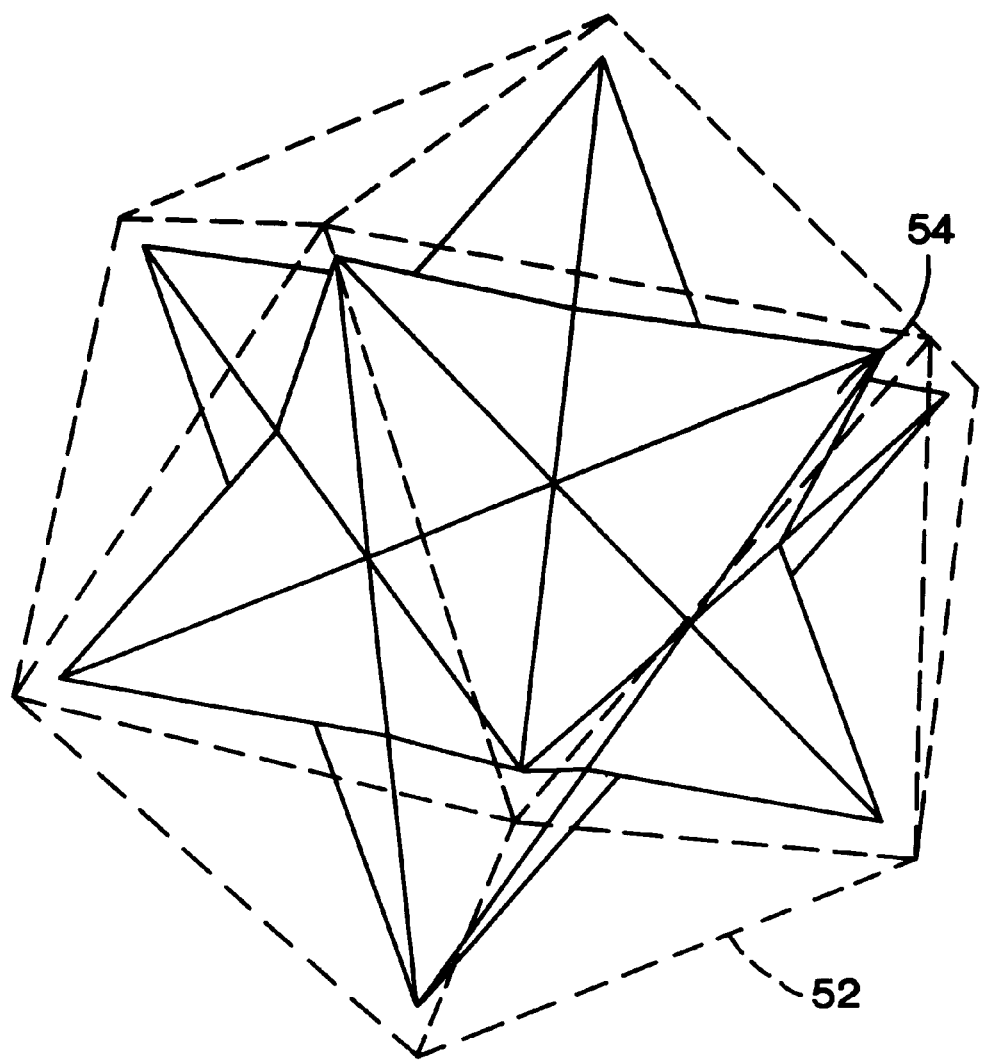
FIG. 6 is a schematic view of a 12 point star dodecahedron 54 surrounded by an icosahedron 52 in phantom.
Figure 7:
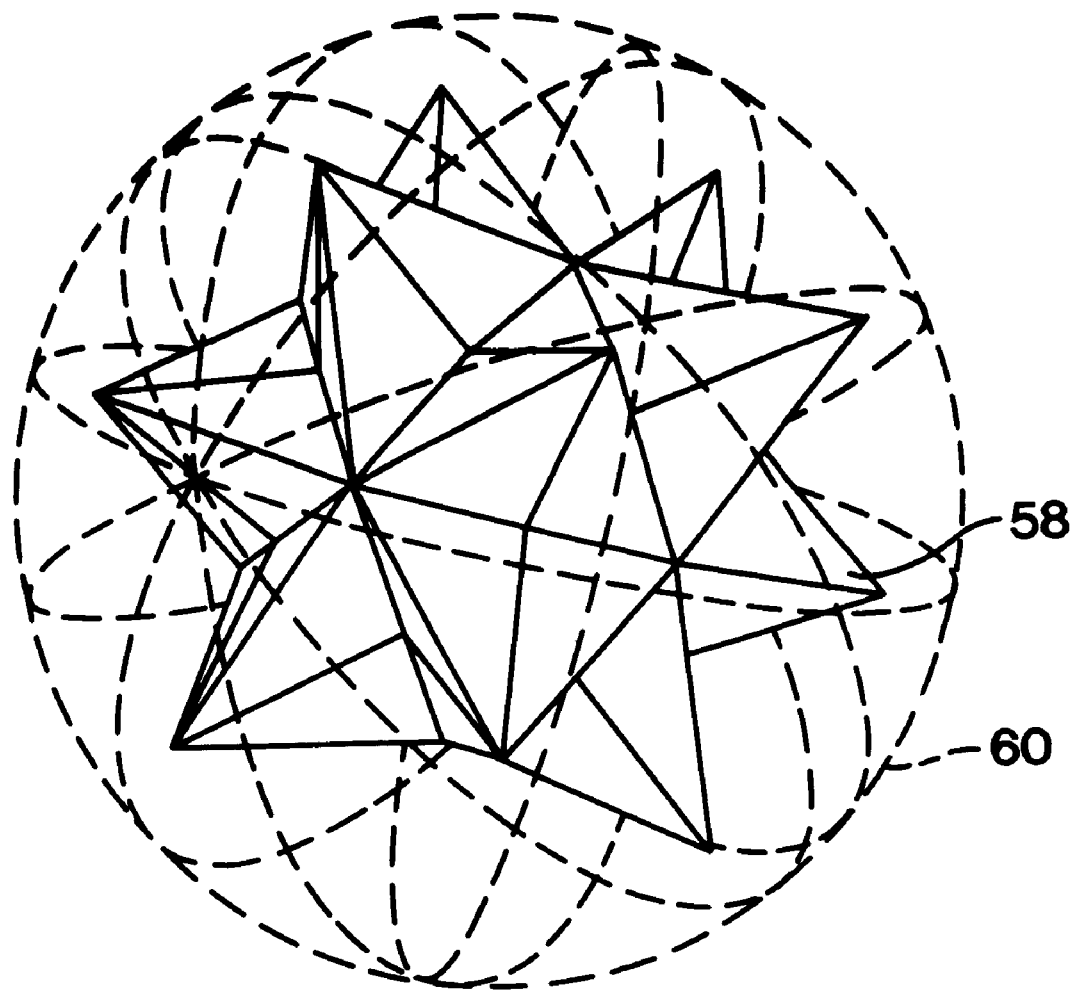
FIG. 7 is a schematic view of a 20 point star icosahedron 58 inside an equally divided sphere 60.
Figure 8:
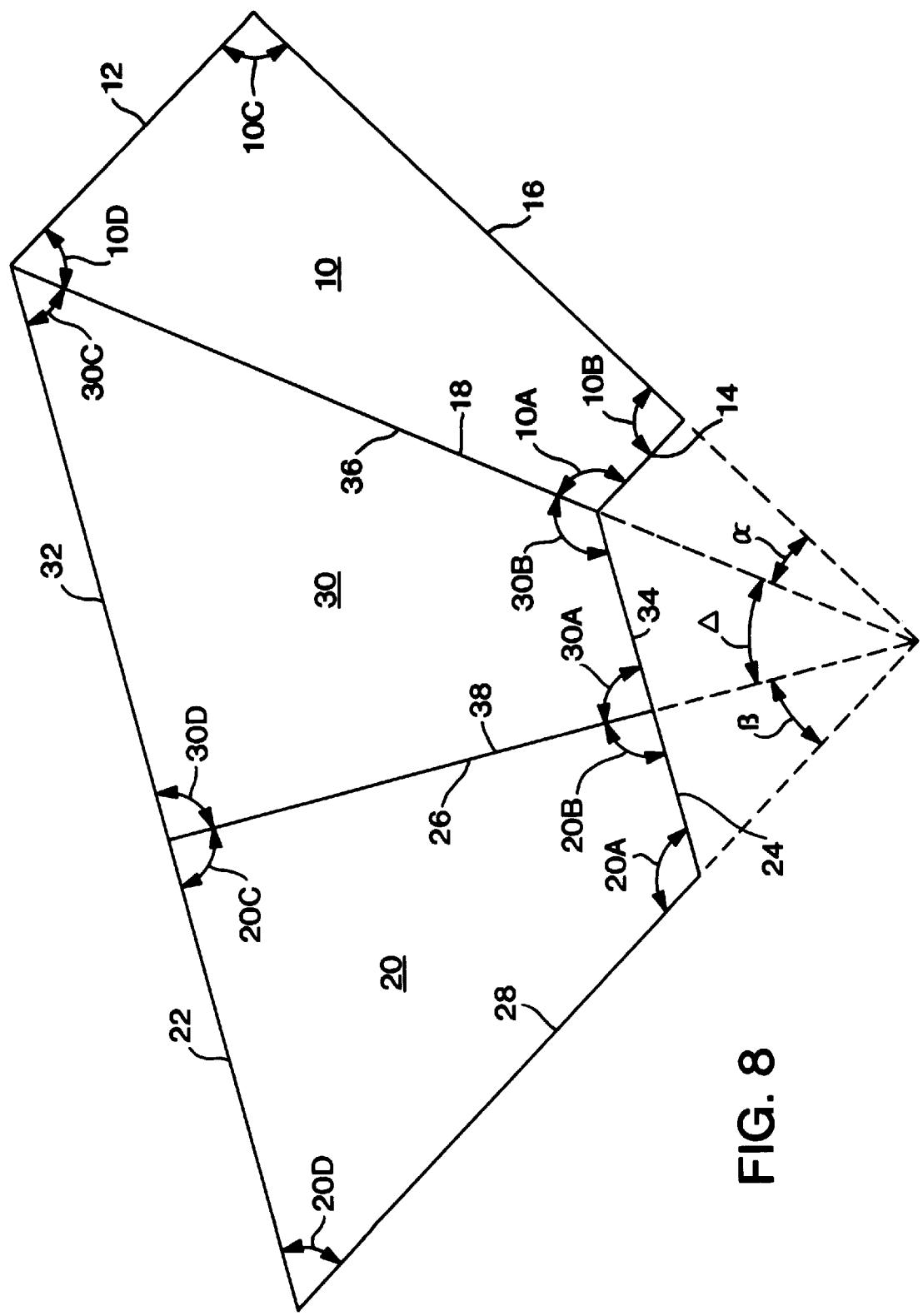
FIG. 8 is a laid open view of the Kaleidoscope 100 of Example 1.
Figure 20:
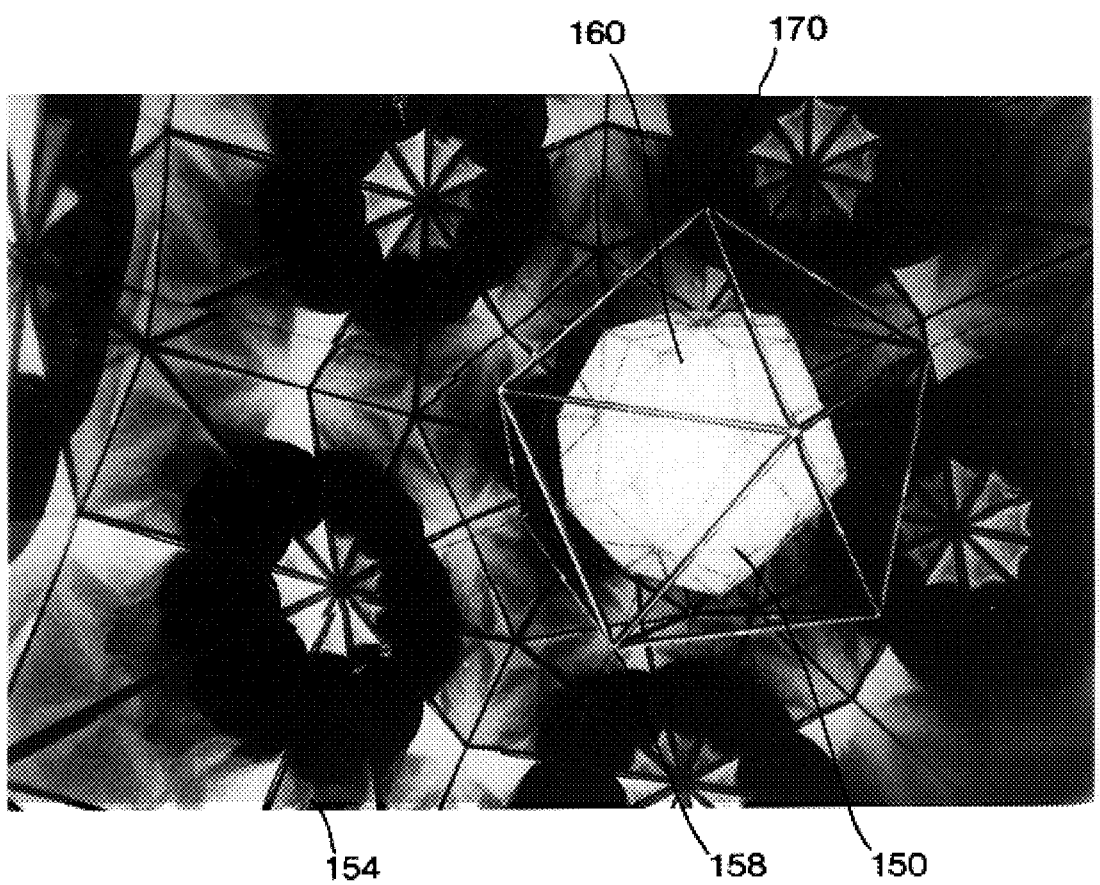
FIG. 20 is a photograph of a first object image 150 surrounded by a second object image 158 produced by the kaleidoscope 100 of Example 2.
Figure 22:
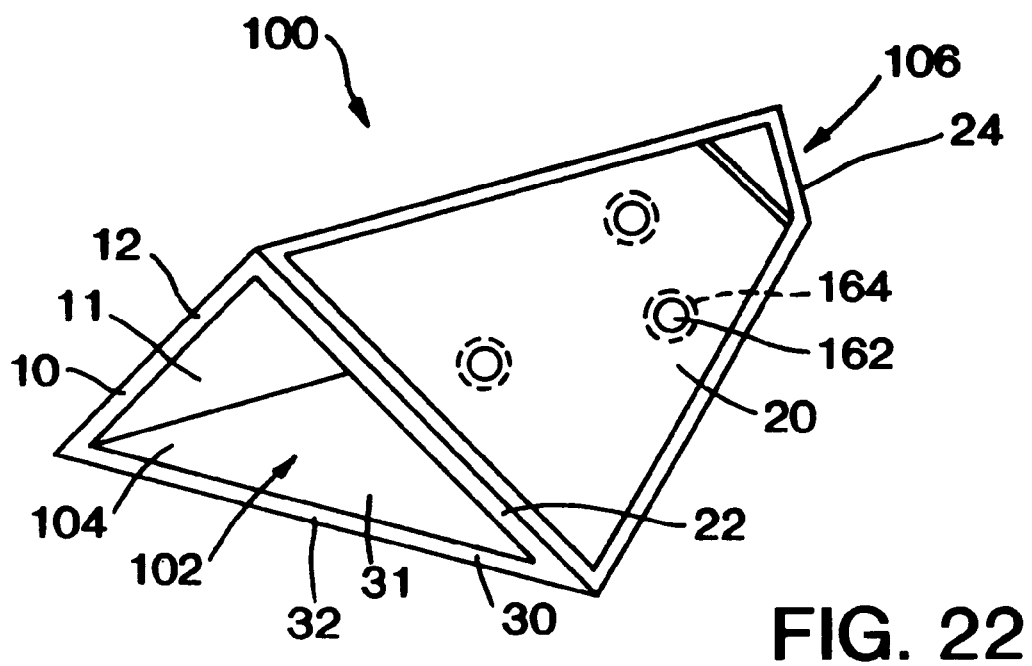
FIG. 22 is a perspective view of the kaleidoscope 100 showing the fron viewing opening 104, randomly placed openings 162 and the second objects 164.

In the preferred embodiment, the Kaleidoscope 100 also has a second object image 158. The second object image 158 appears to surround the first object image 150 (FIGS. 6 and 7). To produce a second object image 158, an opening 162 is provided in one or more of the panels 10, 20 and 30. A second object 164 is then positioned adjacent the opening 162. The shape of the opening 162 will determine the shape of the second object image 158. In the preferred embodiment, a transparent, three dimensional object (not shown) is provided over the opening 162 adjacent the inner reflective surface 11, or 31 of the panels 10, 20 or 30. The object 164 can be of various shapes. The shape of the object 164 will determine the shape of the line which forms the second object 164 image 158. When the object has a hemi-spherical shape, the lines of the second object image 158 will be cylindrical (FIG. 20). When the object 164 is half a cube, the lines of the second object image 158 will have a square cross-section. Consequently, the shape of the object 164 is reflected such as to form a complete three dimensional line. Example 2 shows how to create a second object image 158 having the shape of an icosahedron (FIG. 4). To create randomly placed second object images 162, several openings (not shown) are provided in the at least one of the panels 10, 20 and 30 (FIG. 22). To a viewer, the randomly placed second object images sometimes create an illusion of a star or planet on the walls or sides of the secondary image 154 surrounding the first object image 150 and the second object image 158.

In an alternate embodiment (not shown), the kaleidoscope is constructed of five identical panels. As with the preferred embodiment, panels have a quadrilateral shape with a front edge, a rear edge, a first side and a second side with an inner reflective surface. The panels are mounted together with the rear edges adjacent such as to form a five sided or pentagonal shaped chamber. The kaleidoscope has a front viewing opening and a rear object opening. The chamber has a cross-section the shape of a pentagon. The panels have a shape such that the sides converge and intersect at a point, the converging angle between the sides is 42°. The 42° is double the smallest converging angle of the preferred embodiment. The first object image is produced by placing a first object adjacent the rear object opening. The first object image has the shape of a dodecahedron. A secondary image is also produced. In the preferred embodiment, the secondary image is a dodecahedron.

In another alternate embodiment (not shown) the kaleidoscope has three identical panels. The panels have a quadrilateral shape with a front edge a rear edge, a first side and a second side with a reflective inner surface. The converging angle between the sides of the panels is 64°. The panels are positioned together with the reflective inner surfaces of the panels facing each other and form a container having a front viewing opening and a rear object opening. The 64° is double the middle angle of the second panel 20 of the kaleidoscope 100 of the preferred embodiment. The first object is positioned adjacent the rear object opening. When the rear edges of the panels are straight across, the first object image has the shape of an icosahedron. When the front edges of the panels are straight across, the secondary image would be a dodecahedron. The first object image and the secondary image can be varied by varying the orientation or shape of the rear and front edges of the panels. By making the front or rear edges or both curved with an arcuate shape, the secondary or first object image or both respectively, is a sphere.

The following Examples show the various ways to cut the panels 10, 20 and 30 to produce different images 150, 154 and 158. In all the Examples, the Kaleidoscope 100 is constructed from a first panel 10, a second panel 20 and a third panel 30. The panels 10, 20 and 30 are mounted together such that cross-section of the chamber 102 of the Kaleidoscope 100 has a 90° triangular shape. The panels 10, 20 and 30 are mounted together such that the first side 16 of the first panel 10 is adjacent the second side 28 of the second panel 20 and the second side 18 of the first panel 10 is adjacent the first side 36 of the third panel 30. Necessarily, the first side 26 of the second panel 20 is adjacent the second side 38 of the third panel 30. The shape of the converging angles of the panels 10, 20 and 30 are also the same for all the Examples. In the first panel 10, the first converging angle $\alpha$ between the first and second sides 16 and 18 is 21.0°. The second converging angle $\beta$ between the first and second sides 26 and 28 of the second panel 20 is 32.0°. The third panel 30 has a third converging angle $\Delta$ of 37.75° between the first and second sides 36 and 38. In the Examples, the front edges and/or rear edges 12, 22 and 32 and/or 14, 24 and 34 of the panels 10, 20 and 30 are varied to vary the shape of the first object image 150 or the secondary image 154. In some of the Examples, openings 162 are provided in one or more panels 10, 20 or 30 to provide a second object image 158.

EXAMPLE 1

The rear edge 14 of the first panel 10 was cut such that the first inside angle 10A is 111.0° and the second inside angle 10B is 90.0°. The panel 10 had a length of about 10.0 inches (25.4 cm). However, the length of the panels 10, 20 and 30 can be varied without varying the overall shape of the images 150, 154 and 158. The rear edge 24 of the second panel 20 was cut such that the first inside angle 20A was 122.0° and the second inside angle 20B was 90.0°. The rear edge 34 of the third panel 30 was cut such that the first inside angle 30A was 90.0° and the second inside angle 30B was 127.75°. The orientation of the rear edges 14, 24 and 34 of the panels 10, 20 and 30 allows the first object image 150 to have the shape of a dodecahedron (FIG. 3) when a first object 152 is positioned adjacent the rear object opening 106 of the Kaleidoscope 100. The Kaleidoscope 100 is constructed with the given orientation of the rear edges 14, 24 and 34 of the panels 10, 20 and 30 such that when the circumference of the rear object opening 106 of the Kaleidoscope 100 is traced, a triangle is formed having the angles of 36.0°, 54.0° and 90.0°.

In this Example, the front edges 12, 22 and 32 of the panels 10, 20 and 30 were also cut in a specific orientation to provide a secondary image 154 having a specific shape. The front edge 12 of the first panel 10 was cut such that the third inside angle 10C of the panel 10 was 90.0°. The fourth inside angle 10D was 69.0°. The front edge 22 of the second panel 20 was cut such that the third inside angle 20C was 90.0° and the fourth inside angle 20D was 58.0°. The front edge 32 of the third panel 30 was cut so that the third inside angle 30C was 52.25° and the fourth inside angle 30D was 90.0°. The orientation of the three front edges 12, 22 and 32 of the three panels 10, 20 and 30 produces a secondary image 154 having the shape of a dodecahedron (FIG. 3). When looking through the front viewing opening 104 into the chamber 102 of the Kaleidoscope 100 of Example 1, a user would view the first object 152 in the shape of a dodecahedron which appears to be surrounded by a dodecahedron.

EXAMPLE 2

Figure 9:
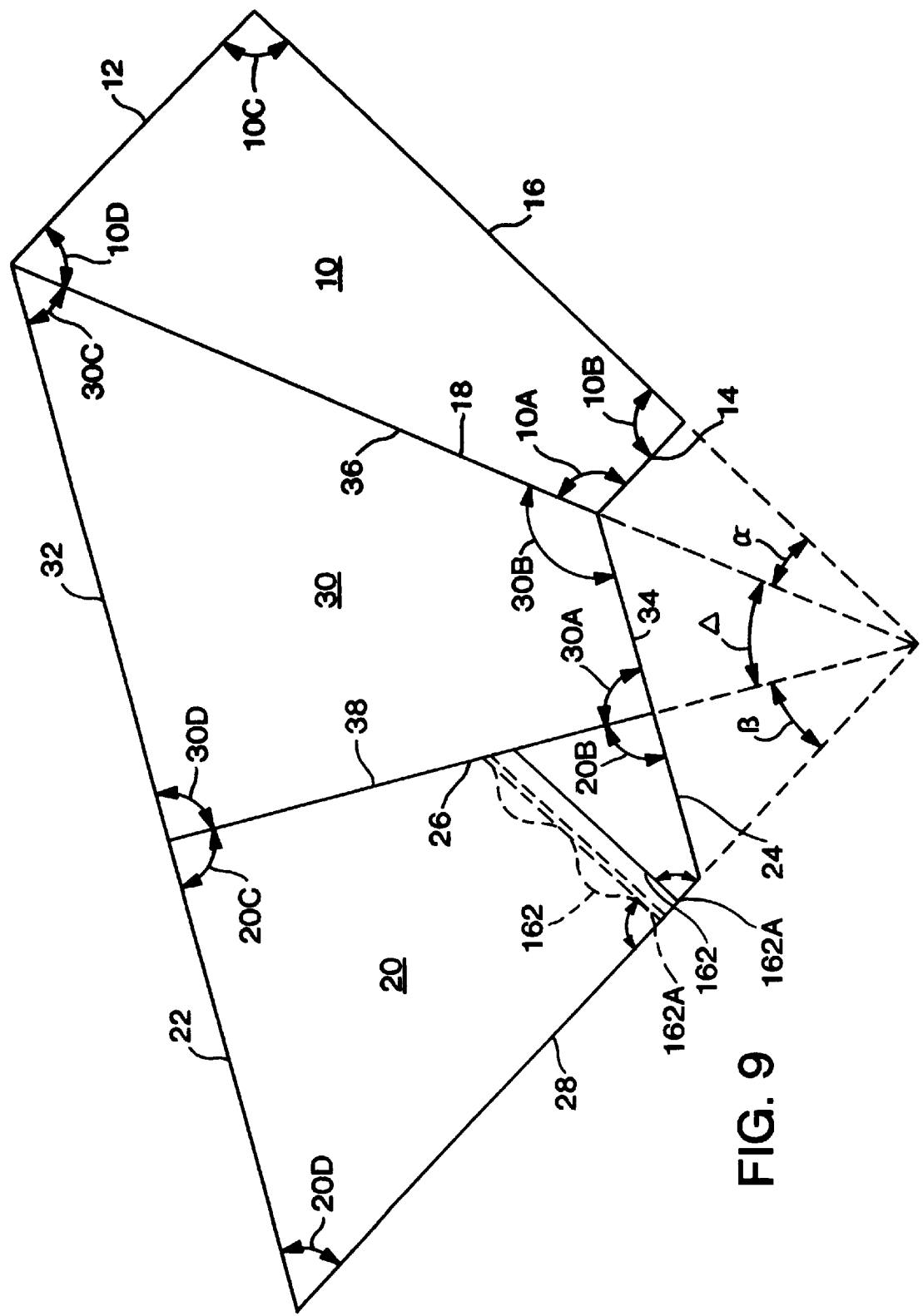
FIG. 9 is a laid open view of the Kaleidoscope 100 of Example 2.
Figure 10:
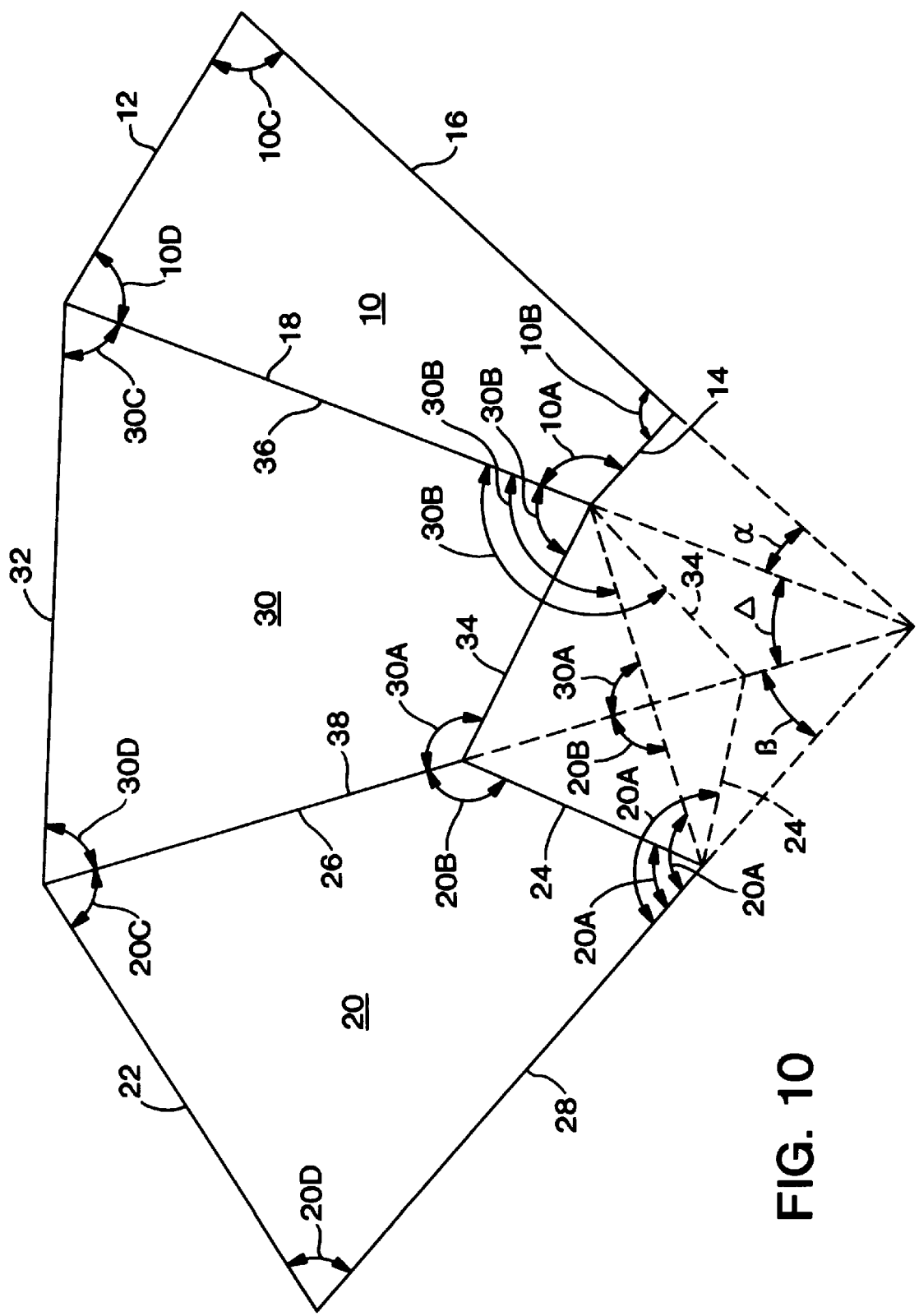
FIG. 10 is a laid open view of the Kaleidoscope 100 of Example 3.

In Example 2, the panels 10, 20 and 30 are cut similarly to the panels 10, 20 and 30 of Example 1 such that the first object image 150 is in the shape of a dodecahedron and the secondary image 154 is in the shape of a dodecahedron (FIGS. 9 and 3). However, an additional opening 162 is provided in the second panel 20 between the front and rear edges 22 and 24 of the panel 20. The opening 162 is rectangular and extends completely between the sides 26 and 28 of the second panel 20. The first end 162A of the opening 162 forms a 90.0° angle with second side 28 of the second panel 20. The opening 162 extends outward in a straight line to the other side 28 of the panel 20 (FIG. 9). The opening 162 could have any shape provided that the first end 162A of the opening 162 comes in contact with the second side 28 of the second panel 20 at a 90.0° angle and the second end 162B of the opening 162 contacts the first side 26 of the panel 20 at an angle along the same trajectory as a straight line from the first end 162A. When looking into the front viewing opening 104 of the Kaleidoscope 100, the user sees a first object image 150 in the shape of a dodecahedron which is surrounded by an icosahedron and which appears to be inside a dodecahedron (FIG. 20).

EXAMPLE 3

The orientation of the rear edge 14 of the first panel 10 is similar to that of the first and second Examples with first and second inside angles 10A and 10B of 111.0° and 90.0°. However, the orientations of the rear edges 24 and 34 of the second and third panels 20 and 30 are varied to vary the first object image 150. The rear edges 24 and 34 of the second and third panels 20 and 30 are varied to provide a first object image 150 having the shape of a dodecahedron, a 12 point star dodecahedron of varying degrees or a reverse 12 point star dodecahedron. To obtain the dodecahedron, the rear edges 24 and 34 of the second and third panels 20 and 30 are cut similarly to the second and third panels 20 and 30 of the first and second Examples. To create a first object image 150 with the shape of a 12 point star dodecahedron, the first inside angle 20A of the second panel 20 is decreased from 122°. The second inside angle 30B of the third panel 30 is correspondingly decreased. The first inside angle 20A of the second panel 20 is varied between the range of 32.0° and 122.0°. The lower limit 32.0° is exactly 90.0° less than 122.0°, the angle necessary to create the dodecahedron. However at 122.0°, the image 150 would be a dodecahedron. The smaller the first inside angle 20A of the second panel 20, the taller or longer the points on the 12 point star dodecahedron. To create a reverse 12 point star dodecahedron, the first inside angle 20A of the second panel 20 is increased beyond 122.0°. The second inside angle 30B of the third panel 30 is also correspondingly increased. The first inside angle 20A of the second panel 20 is increased between 122.0° and 180.0°. The larger the first inside angle 20A the more imploded the points of the 12 point star dodecahedron. The front edges 12, 22 and 32 of the panels 10, 20 and 30 are cut such that the third and fourth inside angles 10c, 10D, 20C, 20D, 30C and 30D for each panel 10, 20 and 30 are the same. The orientation of the front edges 12, 22 and 32 produces a secondary image 154 having the shape of a polyhedron such as to give the user the feeling of looking inside a geodesic dome. The particular orientation of the front edges can be varied to produce different polyhedron geodesic domes. In this particular Example, the third and fourth inside angles 10C and 10D of the first panel 10 are 79.5°, the third and fourth inside angles 20C and 20D of the second panel 20 are 74° and the third and fourth inside angles 30C and 30D of the third panel 30 are 71.125°.

EXAMPLE 4

Figure 11:
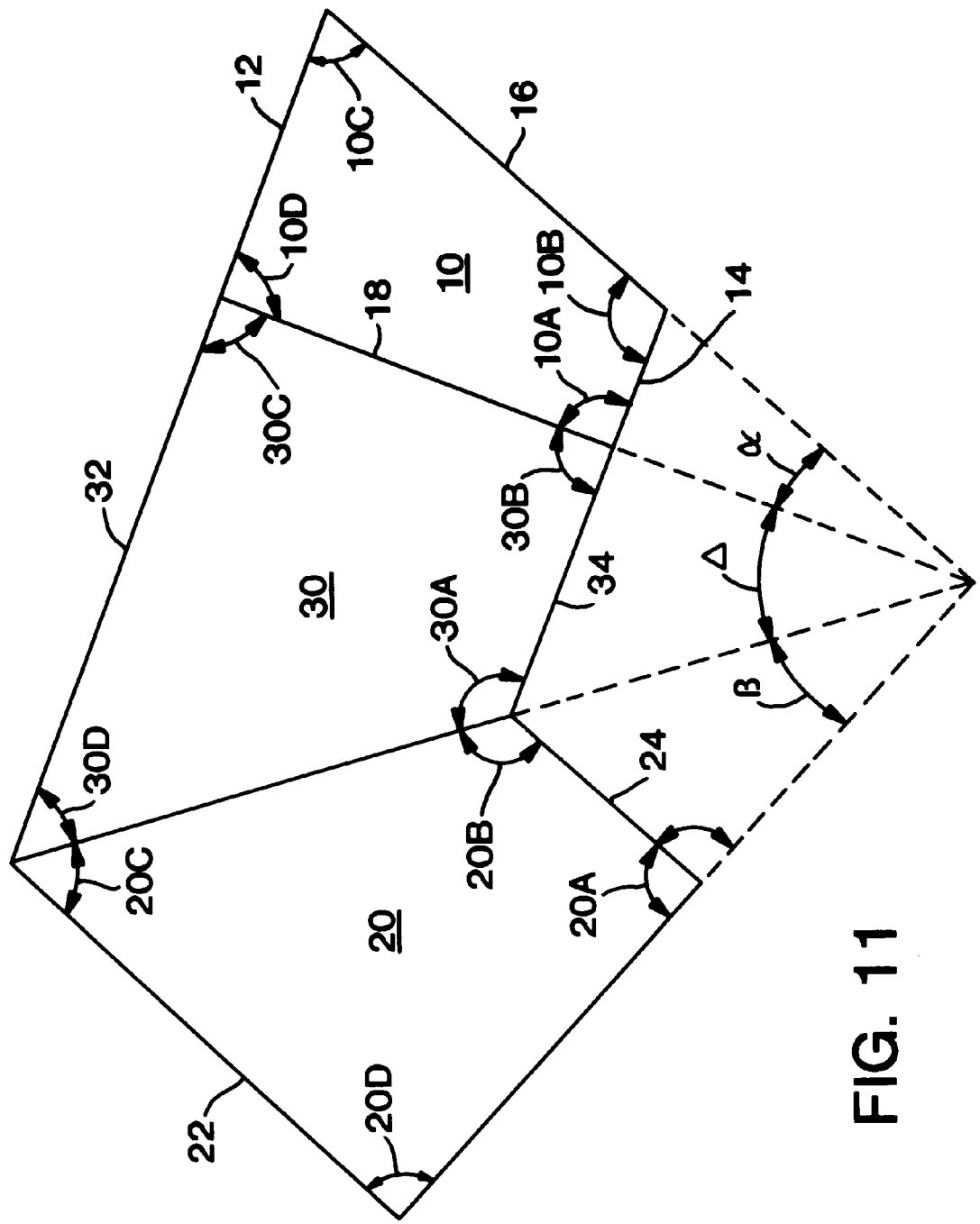
FIG. 11 is a laid open view of the Kaleidoscope 100 of Example 4.

In the fourth Example as shown in FIG. 11, the front and rear edges 12, 22, 32, 14, 24 and 34 of the panels 10, 20 and 30 have the same shape. Consequently, the first object image 150 and the secondary image 154 will have the same shape. In the Example, the shape is an icosahedron (FIGS. 4 and 15). To create the first object image 150, the rear edge 24 of the second panel 20 is cut such that the first inside angle 20A is 90.0° and the second inside angle 20B is 122.0°. The rear edge 14 of the first panel 10 is cut such that the first inside angle 10A is 90.0° and the second inside angle 10B is 111.0°. The third panel 30 is cut such that the first inside angle 30A is 127.75° and the second inside angle 30B is 90.0°.

To produce the secondary image 154 with the shape of an icosahedron, the front edges 12, 22 and 32 of the panel 10, 20 and 30 were cut. The orientation of the front edge 22 of the second panel 20 was such that the fourth inside angle 20D was 90.0° and the third inside angle 20C was 58.0°. The third and fourth inside angles 10C and 10D of the first panel 10 are 69.0° and 90.0°, respectively and the third and fourth inside angles 30C and 30D of the third panel 30 are 90.0° and 52.25°, respectively. When the front viewing opening 104 or the rear object opening 106 of the Kaleidoscope 100 is traced, a triangle is drawn having the angles of 30.0°, 60.0° and 90.0°.

EXAMPLE 5

In the fifth Example, the front edges 12, 22 and 32 of the panels 10, 20 and 30 of the Kaleidoscope 100 are cut similar to the front edges 12, 22 and 32 of the panels 10, 20 and 30 of Examples 1 and 2 (FIG. 12). Consequently, the secondary image 154 of the Kaleidoscope 100 of the fifth Example is a dodecahedron (FIG. 3). In this Example, the shape of the first object image 150 is varied by varying the orientation and first and second inside angles 10A, 10B, 30A and 30B of the first and third panels 10 and 30. The first and second inside angles 20A and 20B of the second panel 20 are 90.0° and 122.0°, respectively similar to the rear edge 24 of the second panel 20 of the fourth Example. By varying the orientation of the rear edges 14 and 34 of the first and third panels 10 and 30, the shape of the first object image 150 is able to be varied between an icosahedron, a 20 point star icosahedron of varying degrees and a reversed 20 point star icosahedron of varying degrees. To obtain a first object image 150 with the shape of an icosahedron, the rear edges 14 and 34 of the first and third panels 10 and 30 are cut similar to the rear edges 14 and 34 of the first and third panels 10 and 30 of the Kaleidoscope 100 of the fourth Example. Thus, the first and second inside angles of the first panel 10 are 90° and 111°. Correspondingly, the first and second inside angles 30A and 30B of the third panel 30 are 127.75° and 90.0°, respectively. To obtain a first object image 150 having the shape of a 20 point star icosahedron, the first inside angle 30A of the third panel 30 is decreased from 127.75°. The angle is varied between 37.75° and 127.75°. However, at 127.75°, the first object image 150 would be an icosahedron. The smaller the first inside angle 30A of the third panel 30, the larger or taller the points on the 20 point star icosahedron. The second inside angle 10B of the first panel 10 is also decreased to correspond to the decrease in the first inside angle 30A of the third panel 30. The second inside angle 10B of the first panel 10 is between a range of approximately about 21.0° and 111.0°. As with the first inside angle 30A of the third panel 30, the smaller the angle, the larger or taller the points of the star dodecahedron. To create the reverse 20 point star icosahedron image, the first inside angle 30A of the third panel 30 is increased above 127.75°. The angle preferably ranges between about 127.75° and 180°. The second inside angle 10B of the first panel 10 correspondingly increases between the range of about 111.0° and 180.0°. At 180°, the user would have the illusion of looking into an empty icosahedron geodesic dome. The greater the angles, the more imploded the points of the reverse star icosahedron.

Figure 21:
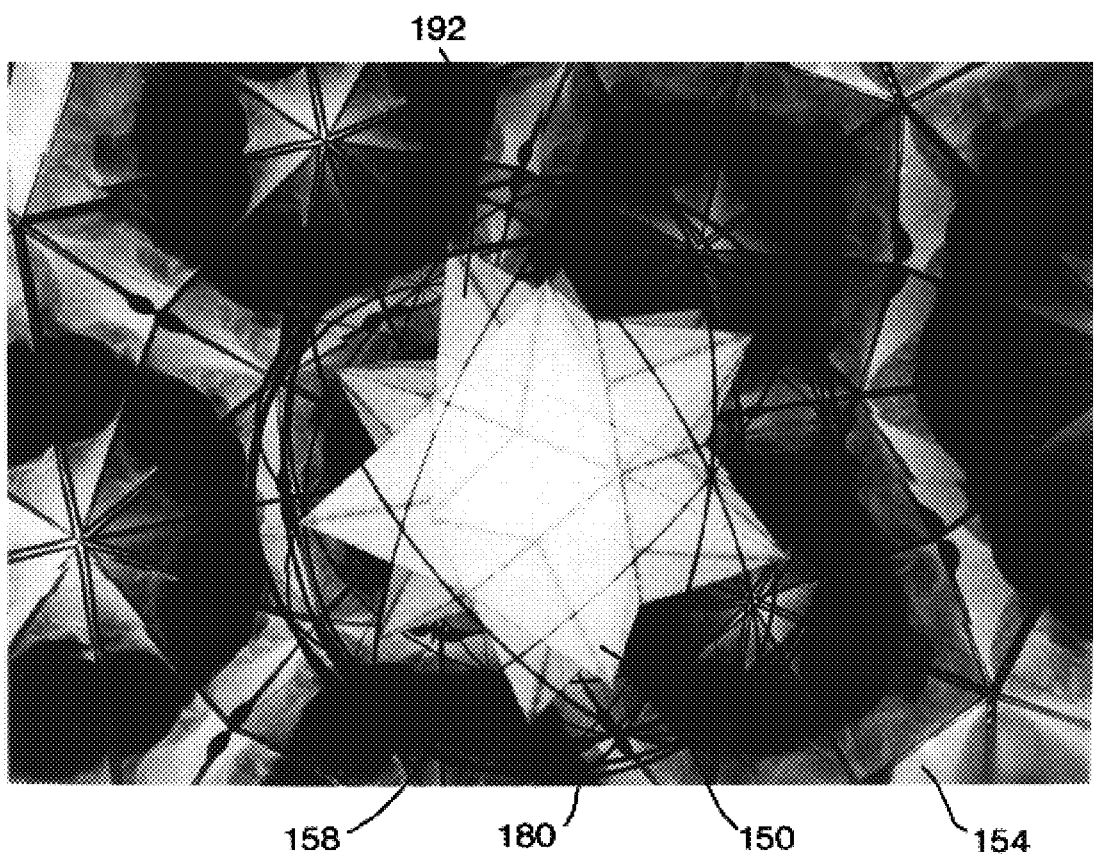
FIG. 21 is photograph of a first object image 150 surrounded by a second object image 158 produced by the kaleidoscope 100 of Example 5.

In this Example, the Kaleidoscope 100 also has a second object opening 162. The second object opening 162 extends across each panel 10, 20 and 30 and has an arcuate shape. The curve of the opening 162 are similar and form an arc of a circle having its center at the point where the sides 16, 18, 26, 28, 36 and 38 of the panels 10, 20 and 30 would converge at a point. The arcuate openings 162 produce a second object image 158 having the shape of an equally divided sphere. When the user looks into the viewing end of the Kaleidoscope 100, the viewer will see a first object image 150 having the shape of either a icosahedron, a 20 point star icosahedron of varying degrees or a reverse 20 point star icosahedron of varying degrees. The first object image 150 will be surrounded or appear to be surrounded by the second object image 158 which has the shape of an equally divided sphere (FIG. 14). The user will also get the feeling of actually looking inside a geodesic dome (FIG. 21).

It is intended that the foregoing description be only illustrative of the present invention and that the present invention be limited only by the hereinafter appended claims.

I claim:

1. A kaleidoscope for viewing a first object reflection of a first object and a second object reflection of a second object, which comprises: three panels having front and rear ends with sides and a reflective inner surface therebetween and positioned together such that the reflective inner surfaces of the panels are facing each other such as to form a chamber having a front viewing opening and a rear object opening wherein the three panels are mounted together such that the rear ends of the panels are adjacent each other and the front ends of the panels are adjacent each other and wherein a first side of a first panel is adjacent a second side of a second panel and a second side of the first panel is adjacent a first side of a third panel such that a first side of the second panel is adjacent to a second side of the third panel and the chamber has a triangular shape wherein when the first object is positioned adjacent the rear object opening, the first object reflection is produced, wherein an aperture is provided in one of the panels between the front end and rear end such that when the second object is placed adjacent the aperture, the second object reflection is produced, and wherein an angle between the first side of the first panel and the rear end of the first panel is 90° and the first object reflection has a shape of a dodecahedron comprised of triangles with the angles of 36°, 54° and 90°.

2. The kaleidoscope of claim 1 wherein the aperture extends completely across the panel between the sides of the panel.

3. The kaleidoscope of claim 2 wherein one end of the aperture forms a 90° angle with one side of the panel and the second object reflection has a shape of an icosahedron.

4. The kaleidoscope of claim 1 wherein the chamber has a 90° triangular shape.

5. The kaleidoscope of claim 1 wherein an angle between the first side and the front end of the first panel is 90° and a secondary reflection having a shape of a dodecahedron is produced which surrounds the first object reflection and the second object reflection.

6. The kaleidoscope of claim 1 wherein an angle between the second side and the front end of the second panel is 90° and a secondary reflection having a shape of an icosahedron is produced which surrounds the first object reflection and the second object reflection.

7. The kaleidoscope of claim 1 wherein orientations of the rear ends of at least one panel is varied to vary a shape of the first object reflection.

8. The kaleidoscope of claim 1 wherein an orientation of the front end of at least one panel is varied to vary a shape of a secondary reflection.

9. The kaleidoscope of claim 1 wherein an orientation of the rear end of the second panel is such that inside angles between the rear end and each of the sides of the panel are 90° and 122° and an orientation of the rear ends of the other panels vary such that the first object reflection is either an icosahedron, a 20 point star icosahedron or a reversed icosahedron.

10. The kaleidoscope of claim 1 wherein an orientation of the rear end of the first panel is such that the inside angles are 90° and 111° and wherein an orientation of the rear ends of the second and third panels are varied such that the first object reflection is either a dodecahedron, a 12 point star dodecahedron or a reversed 12 point star dodecahedron.

11. The kaleidoscope of claim 1 wherein an orientation of the front end of the third panel is varied such that an inside angle between the front end and the side adjacent the first panel varies from between 0° and 52.25° and an orientation of the front end of the second panel is varied such that an inside angle between the front end and the side adjacent the first panel varies from between 0° to 58° which provides a secondary reflection having a shape of a dodecahedron or a reverse dodecahedron.

12. The kaleidoscope of claim 1 wherein the front ends of the panels are curved such that a secondary reflection has the shape of an equally divided sphere.

13. The kaleidoscope of claim 1 wherein the aperture has an arcuate shape and is positioned in each of the panels between the ends and extends between the sides of the panels such that when the second object is positioned adjacent the aperture, the second object reflection having a spherical shape is formed.

14. The kaleidoscope of claim 1 wherein the second object has a three-dimensional shape and is placed adjacent the aperture on the inner reflective surface of one of the panels.

15. A kaleidoscope for viewing a first object reflection of a first object and a second object reflection of a second object, which comprises: three panels having front and rear ends with sides and a reflective inner surface therebetween and positioned together such that the reflective inner surfaces of the panels are facing each other such as to form a chamber having a front viewing opening and a rear object opening wherein the three panels are mounted together such that the rear ends of the panels are adjacent each other and the front ends of the panels are adjacent each other and wherein a first side of a first panel is adjacent a second side of a second panel and a second side of the first panel is adjacent a first side of a third panel such that a first side of the second panel is adjacent to a second side of the third panel and the chamber has a triangular shape wherein when the first object is positioned adjacent the rear object opening the first object reflection is produced, wherein an aperture is provided in one of the panels between the front end and rear end such that when the second object is placed adjacent the aperture, the second object reflection is produced, and wherein an orientation of the front end of the second panel is such that an inside angle between the side and the front end adjacent the first panel is 90° and an inside angle between the front end and the side adjacent the third panel is 58° and wherein an orientation of the front end of the first panel is such that an inside angle between the side adjacent the second panel and the front end is 69° and an inside angle between the front end and the side adjacent the third panel is 90° and wherein an orientation of the front end of the third panel is such that an inside angle between the side adjacent the second panel and the front end is 52.25° and an inside angle between the front end of the third panel and the side adjacent the first panel is 90° such that the secondary reflection is an icosahedron.

16. The kaleidoscope of claim 15 wherein when the sides of each of three of the panels are extended such that the sides of each of the panels converge and meet at a point and each of the panels has a triangular shape with an angle between the sides, the angle of each of three of the panels are 21.0°, 32.0° and 37.75° and wherein the first object reflection is a dodecahedron, icosahedron or an equally divided sphere.

17. The kaleidoscope of claim 15 wherein an angle between the second side of the second panel and the rear end of the second panel is 90° and the first object reflection has a shape of an icosahedron comprised of triangles with the angles of 60°, 30° and 90°.

18. The kaleidoscope of claim 15 wherein an orientation of the rear end of the first panel is such that an inside angle between the side of the first panel and the rear end of the first panel and adjacent the second panel is between 21.0° and 111° and the orientation of the rear end of the third panel is such that an inside angle between the side of the third panel and the rear end of the third panel and adjacent the second panel is between 37.75° and 127.75° and the first object reflection is a 20 point star icosahedron.

19. The kaleidoscope of claim 15 wherein an orientation of the rear end of the first panel is such that an inside angle between the side of the first panel and the rear end of the first panel and adjacent the second panel is between 111° and 180° and an orientation of the rear end of the third panel is such that an inside angle between the side of the third panel and the rear end of the third panel and adjacent the second panel is between 127.75° and 180° such that the first object reflection is a reverse icosahedron.

20. The kaleidoscope of claim 15 wherein the rear end of the panels are curved such that the first object reflection has the shape of an equally divided sphere.

21. A kaleidoscope for viewing a first object reflection of a first object and a second object reflection of a second object, which comprises: three panels having front and rear ends with sides and a reflective inner surface therebetween and positioned together such that the reflective inner surfaces of the panels are facing each other such as to form a chamber having a front viewing opening and a rear object opening wherein the three panels are mounted together such that the rear ends of the panels are adjacent each other and the front ends of the panels are adjacent each other and wherein a first side of a first panel is adjacent a second side of a second panel and a second side of the first panel is adjacent a first side of a third panel such that a first side of the second panel is adjacent to a second side of the third panel and the chamber has a triangular shape wherein when the first object is positioned adjacent the rear object opening the first object reflection is produced, wherein an aperture is provided in one of the panels between the front end and rear end such that when the second object is placed adjacent the aperture, the second object reflection is produced, and wherein an orientation of the front end of the first panel is such that an inside angle between the front end and the side adjacent the second panel is 90° and an inside angle between the front end and the side adjacent the third panel is 69°, and an orientation of the front end of the second panel is such that an inside angle between the front end and the side adjacent the third panel is 90° and an inside angle between the front end and the side adjacent the first panel is 58° and wherein an orientation of the front end of the third panel is such that an inside angle between the front end and the side adjacent the second panel is 90° and an inside angle between the front end and the side adjacent the first panel is 52.25° such that the secondary reflection is a dodecahedron.

22. A kaleidoscope for viewing at least a first object reflection of a first object and a secondary reflection, which comprises: a first panel having a front end and a rear end with first and second sides extending therebetween, the first panel having a reflective inner surface and rear inside angles between the first and second sides and the rear end and front inside angles between the first and second sides and the front end; a second panel having a front end and a rear end with first and second sides extending therebetween, the second panel having a reflective inner surface and rear inside angles between the first and second sides and the rear end and front inside angles between the first and second sides and the front end, the second panel being positioned adjacent the first panel such that the first side of the first panel is adjacent the second side of the second panel; and a third panel having a front end and a rear end with first and second sides extending therebetween, the third panel having an inner reflective surface and rear inside angles between the rear end and the first and second sides and front inside angles between the first and second sides and the front end wherein the third panel is positioned adjacent the first and second panels such that the first side of the third panel is adjacent the second side of the first panel and the second side of the third panel is adjacent the first side of the second panel, the panels are positioned together such that the inner reflective surfaces of each panel are facing each other and the rear ends of the panels are adjacent each other such that the panels form a chamber having a front viewing end and a rear object end and wherein the rear inside angles of the panels are varied to vary the shape of the first object reflection and the front inside angles are varied to vary the shape of the secondary reflection and wherein the front inside angle between the side and the front end of the second panel adjacent the first panel is 90° and the front inside angle between the front end and the side of the second panel adjacent the third panel is 58° and wherein the front inside angle of the first panel between the side adjacent the second panel and the front end is 69° and the front inside angle between the front end and the side adjacent the third panel is 90° and wherein the front inside angle of the third panel adjacent the second panel and the front end is 52.25° and the front inside angle between the front end of the third panel and the other side adjacent the first panel is 90° such that the secondary reflection is an icosahedron.

23. The kaleidoscope of claim 22 wherein the orientation of the rear end of the second panel is such that inside angles between adjacent the rear end and each of the sides of the panel are 90° and 122° and wherein an orientation of the rear ends of the first and third panels are varied such that the first object reflection is either an icosahedron, a 20 point star icosahedron or a reverse 20 point star icosahedron.

24. The kaleidoscope of claim 23 wherein the orientation of the rear end of the first panel is such that the rear inside angle between the side of the first panel and the rear end of the first panel and adjacent the second panel is between 21° and 111° and the orientation of the rear end of the third panel is such that the rear inside angle between the side of the third panel and the rear end of the third panel and adjacent the second panel is between 37.75° and 127.75° and the first object reflection is a 20 point star icosahedron.

25. The kaleidoscope of claim 23 wherein the orientation of the rear end of the first panel is such that the rear inside angle between the side of the first panel and the rear end of the first panel and adjacent the second panel is between 111° and 180° and the orientation of the rear end of the third panel is such that the rear inside angle between the side of the third panel and the rear end of the third panel and adjacent the second panel is between 127.75° and 180° such that the first object reflection is a reverse icosahedron.

26. The kaleidoscope of claim 22 wherein an aperture is positioned on the second panel between the front and rear ends and extends between the sides of the panel such that when a second object is positioned adjacent the aperture a second object reflection is produced.

27. The kaleidoscope of claim 26 wherein the aperture is positioned such that one end of the aperture adjacent one side of the second panel adjacent the first panel forms a 90° with the side and another end of the aperture adjacent another side of the second panel adjacent the third panel forms a 122° inside angle with the side such that the second object reflection has the shape of an icosahedron.

28. The kaleidoscope of claim 22 wherein an orientation of the rear end of the first panel is such that the rear inside angles of the first panel are 90° and 111° and wherein an orientation of the rear ends of the second and third panels are varied such that the first object reflection is either a dodecahedron, a 12 point star dodecahedron or a reversed 12 point star dodecahedron.

29. The kaleidoscope of claim 22 wherein the rear ends of the panels are curved such that the first object reflection has the shape of an equally divided sphere.

30. The kaleidoscope of claim 22 wherein the front ends of the panels are curved such that the secondary reflection has the shape of an equally divided sphere.

31. The kaleidoscope of claim 22 wherein an arcuate aperture is positioned in each of the panels between the front end and the rear end and extends between the sides of the panel so that when a second object is positioned adjacent the aperture, a second object reflection having a shape of an equally divided sphere is produced.

32. The kaleidoscope of claim 22 wherein an aperture is provided in one of the panels between the front viewing opening and rear object opening so that when a second object is placed adjacent the aperture a second object reflection is produced.

33. The kaleidoscope of claim 32 wherein the aperture extends completely across the panel and wherein one end of the aperture forms a 90° angle with one side of the panel and the second object reflection has a shape of an icosahedron.

34. The kaleidoscope of claim 32 wherein the second object has a three-dimensional shape and is placed adjacent the aperture on the inner reflective surface of one of the panels.

35. The kaleidoscope of claim 22 wherein when the sides of the first panel are extended such that the sides converge and meet at a point, an angle between the sides of the first panel is 21.0°.

36. The kaleidoscope of claim 22 wherein when the sides of the first panel are extended such that the sides converge and meet at a point, an angle between the sides of the first panel is 32.0°.

37. The kaleidoscope of claim 22 wherein when the sides of the first panel are extended such that the sides converge and meet at a point, an angle between the sides of the first panel is 37.75°.

38. The kaleidoscope of claim 22 wherein an orientation of the rear end of the second panel is such that the rear inside angles of the second panel between the rear end and each of the sides of the second panel are 90.0° and 122.0° and wherein when a circumference of the rear object opening of the kaleidoscope is traced, a triangle having angles of 30.0°, 60.0° and 90° is formed and the first object reflection is an icosahedron.

39. A kaleidoscope for viewing at least a first object reflection of a first object and a secondary reflection, which comprises: a first panel having a front end and a rear end with first and second sides extending therebetween, the first panel having a reflective inner surface and rear inside angles between the first and second sides and the rear end and front inside angles between the first and second sides and the front end; a second panel having a front end and a rear end with first and second sides extending therebetween, the second panel having a reflective inner surface and rear inside angles between the first and second sides and the rear end and front inside angles between the first and second sides and the front end, the second panel being positioned adjacent the first panel such that the first side of the first panel is adjacent the second side of the second panel; and a third panel having a front end and a rear end with first and second sides extending therebetween, the third panel having an inner reflective surface and rear inside angles between the rear end and the first and second sides and front inside angles between the first and second sides and the front end wherein the third panel is positioned adjacent the first and second panels such that the first side of the third panel is adjacent the second side of the first panel and the second side of the third panel is adjacent the first side of the second panel, the panels are positioned together such that the inner reflective surfaces of each panel are facing each other and the rear ends of the panels are adjacent each other such that the panels form a chamber having a front viewing end and a rear object end and wherein the rear inside angles of the panels are varied to vary the shape of the first object reflection and the front inside angles are varied to vary the shape of the secondary reflection and wherein the front inside angle of the first panel between the front end and the side adjacent the second panel is 90° and the front inside angle between the front end and the side adjacent the third panel is 69°, the front inside angle of the second panel between the front end and the side adjacent the third panel is 90° and the front inside angle between the front end and the side adjacent the first panel is 58° wherein the front inside angle of the third panel between the front end and the side adjacent the second panel is 90° and the front inside angle between the front end and the side adjacent the first panel is 52.25° wherein the secondary reflection is a dodecahedron.

40. A kaleidoscope for viewing at least a first object reflection of a first object and a secondary reflection, which comprises: a first panel having a front end and a rear end with first and second sides extending therebetween, the first panel having a reflective inner surface and rear inside angles between the first and second sides and the rear end and front inside angles between the first and second sides and the front end; a second panel having a front end and a rear end with first and second sides extending therebetween, the second panel having a reflective inner surface and rear inside angles between the first and second sides and the rear end and front inside angles between the first and second sides and the front end, the second panel being positioned adjacent the first panel such that the first side of the first panel is adjacent the second side of the second panel; and a third panel having a front end and a rear end with first and second sides extending therebetween, the third panel having an inner reflective surface and rear inside angles between the rear end and the first and second sides and front inside angles between the first and second sides and the front end wherein the third panel is positioned adjacent the first and second panels such that the first side of the third panel is adjacent the second side of the first panel and the second side of the third panel is adjacent the first side of the second panel, the panels are positioned together such that the inner reflective surfaces of each panel are facing each other and the rear ends of the panels are adjacent each other such that the panels form a chamber having a front viewing end and a rear object end and wherein the rear inside angles of the panels are varied to vary the shape of the first object reflection and the front inside angles are varied to vary the shape of the secondary reflection and wherein the rear inside angles of the first panel adjacent the rear end are 90.0° and 58.0° and wherein when a circumference of the rear object opening of the kaleidoscope is traced a triangle having 36.0°, 54.0° and 90° is formed.

41. The kaleidoscope of claim 40 wherein the front inside angle of the third panel between the front end and the side adjacent the first panel varies from between 0° and 52.25° and the front inside angle of the second panel between the front end and the side adjacent the first panel varies from between 0° to 58° to provide a secondary reflection having the shape of a reverse dodecahedron or a dodecahedron.

42. The kaleidoscope of claim 40 wherein the front inside angle of the third panel between the front end and the side adjacent the first panel varies from between 52.25° and 180° and the front inside angle of the second panel between the front end and the side adjacent the first panel varies from between 58° to 180° to provide the secondary reflection having a shape of a star dodecahedron or a dodecahedron.

\* \* \* \* \*